United States Patent
Shinozaki

(10) Patent No.: US 11,606,107 B2
(45) Date of Patent: Mar. 14, 2023

(54) RADIO FREQUENCY MODULE AND COMMUNICATION DEVICE

(71) Applicant: Murata Manufacturing Co., Ltd., Nagaokakyo (JP)

(72) Inventor: Takayuki Shinozaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 26 days.

(21) Appl. No.: 17/022,139

(22) Filed: Sep. 16, 2020

(65) Prior Publication Data

US 2021/0091797 A1    Mar. 25, 2021

(30) Foreign Application Priority Data

Sep. 20, 2019 (JP) ............................. JP2019-171650

(51) Int. Cl.
*H04B 1/00* (2006.01)
*H04B 1/525* (2015.01)
*H04L 5/14* (2006.01)

(52) U.S. Cl.
CPC ........... *H04B 1/0057* (2013.01); *H04B 1/006* (2013.01); *H04B 1/525* (2013.01); *H04L 5/1461* (2013.01)

(58) Field of Classification Search
CPC ...... H04B 1/0057; H04B 1/006; H04B 1/525; H04L 5/1461
See application file for complete search history.

(56) References Cited

U.S. PATENT DOCUMENTS

2016/0380652 A1* 12/2016 Anthony ............. H04W 52/283
  375/295
2017/0149469 A1* 5/2017 Kitajima .............. H05K 1/0243

FOREIGN PATENT DOCUMENTS

JP    2017-017691 A    1/2017

* cited by examiner

*Primary Examiner* — Kibrom T Hailu
*Assistant Examiner* — Nizam U Ahmed
(74) *Attorney, Agent, or Firm* — Xsensus LLP

(57) ABSTRACT

A radio frequency module is capable of at least one of simultaneously transmitting, simultaneously receiving, or simultaneously transmitting and receiving a radio frequency signal of a first communication band and a radio frequency signal of a second communication band. The radio frequency module includes: a module board including a first principal surface and a second principal surface on opposite sides of the module board; a first duplexer having, as pass bands, a transmission band and a reception band of the first communication band; and a second duplexer having, as pass bands, a transmission band and a reception band of the second communication band. The first duplexer is disposed on the first principal surface and the second duplexer is disposed on the second principal surface.

20 Claims, 8 Drawing Sheets

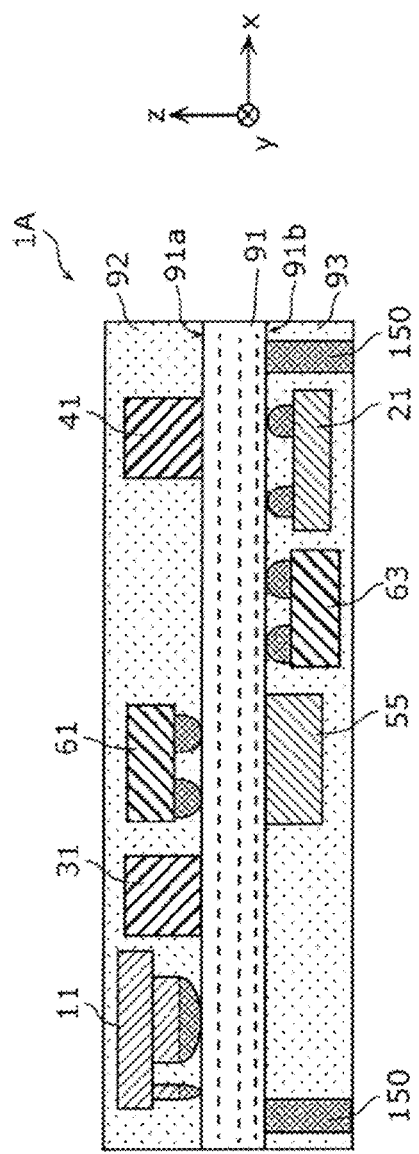

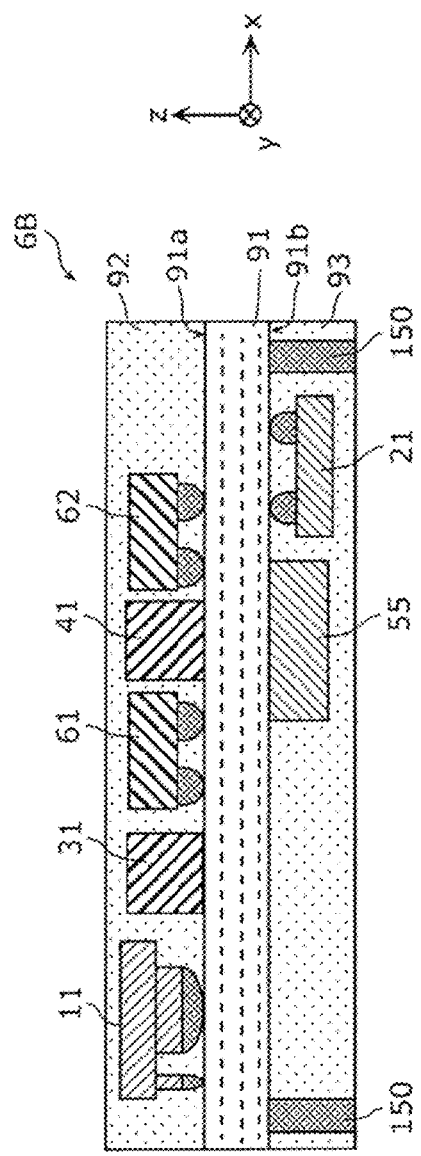

RADIO FREQUENCY MODULE AND COMMUNICATION DEVICE

CROSS REFERENCE TO RELATED APPLICATION

The present application is based on and claims priority of Japanese Patent Application No. 2019-171650 filed on Sep. 20, 2019. The entire disclosure of the above-identified application, including the specification, drawings and claims is incorporated herein by reference in its entirety.

TECHNICAL FIELD

The present disclosure relates to a radio frequency module and a communication device.

BACKGROUND

It is required to apply the system of simultaneously using different frequency bands (communication bands) to radio frequency front-end modules that support multi-band technologies and multimode technologies.

Japanese Unexamined Patent Application Publication No. 2017-17691 discloses in FIG. 2B the circuit configuration of an electronic system (radio frequency front-end module) that includes a first transfer circuit and a second transfer circuit. More specifically, the first transfer circuit includes: a first power amplifier that amplifies a radio frequency signal of one frequency region (a first frequency band group); a first antenna switch; a first band selection switch disposed on a first signal path that connects the first power amplifier and the first antenna switch; and a plurality of first duplexers connected to the first band selection switch. The second transfer circuit includes: a second power amplifier that amplifies a radio frequency signal of another frequency region (a second frequency band group); a second antenna switch; a second band selection switch disposed on a second signal path that connects the second power amplifier and the second antenna switch; and a plurality of second duplexers connected to the second band selection switch. According to this configuration, it is possible to perform at least one of simultaneously transmitting, simultaneously receiving, or simultaneously transmitting and receiving a first radio frequency signal that is transferred through the first transfer circuit and a second radio frequency signal that is transferred through the second transfer circuit.

SUMMARY

Technical Problems

However, as recognized by the present inventor, when the electronic system disclosed by Japanese Unexamined Patent Application Publication No. 2017-17691 is included in a single radio frequency module as a small-sized front-end circuit such as a mobile communication device, there arises a problem that the radio frequency signals that are simultaneously transmitted, simultaneously received, or simultaneously transmitted and received interfere with each other, and thus the isolation between the radio frequency signals that are simultaneously transmitted, simultaneously received, or simultaneously transmitted and received deteriorates. In particular, in the case of a first reception signal and a second reception signal that are simultaneously received, there are instances where the isolation between the first reception signal and the second reception signal deteriorates due to magnetic field coupling, electric field coupling, or electromagnetic field coupling between a first duplexer that passes the first reception signal and a second duplexer that passes the second reception signal.

The present disclosure is to address the above-describe problems, and is to provide a radio frequency module that, when performing at least one of simultaneously transmitting, simultaneously receiving, or simultaneously transmitting and receiving a plurality of radio frequency signals, reduces deterioration of the isolation between the plurality of radio frequency signals, and a communication device that includes the radio frequency module.

Solutions

In order to provide such a radio frequency module and such a communication device, a radio frequency module according to one aspect of the present disclosure is a radio frequency module capable of at least one of simultaneously transmitting, simultaneously receiving, or simultaneously transmitting and receiving a radio frequency signal of a first communication band and a radio frequency signal of a second communication band. The radio frequency module includes: a module board including a first principal surface and a second principal surface on opposite sides of the module board; a first duplexer including a first transmission filter and a first reception filter, the first transmission filter having, as a pass band, a transmission band of the first communication band, the first reception filter having, as a pass band, a reception band of the first communication band; and a second duplexer including a second transmission filter and a second reception filter, the second transmission filter having, as a pass band, a transmission band of the second communication band, the second reception filter having, as a pass band, a reception band of the second communication band. In the radio frequency module, the first duplexer is disposed on the first principal surface, and the second duplexer is disposed on the second principal surface.

Advantageous Effects

According to the present disclosure, it is possible to provide a radio frequency module and a communication device that reduce deterioration of isolation between a plurality of radio frequency signals when the plurality of radio frequency signals are simultaneously transmitted, simultaneously received, or simultaneously transmitted and received.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2B is a schematic diagram illustrating a cross-sectional configuration of the radio frequency module according to Working example 1.

FIG. 5B is a schematic diagram illustrating a cross-sectional configuration of the radio frequency module according to Working example 3.

DESCRIPTION OF EMBODIMENTS

Figure 1:
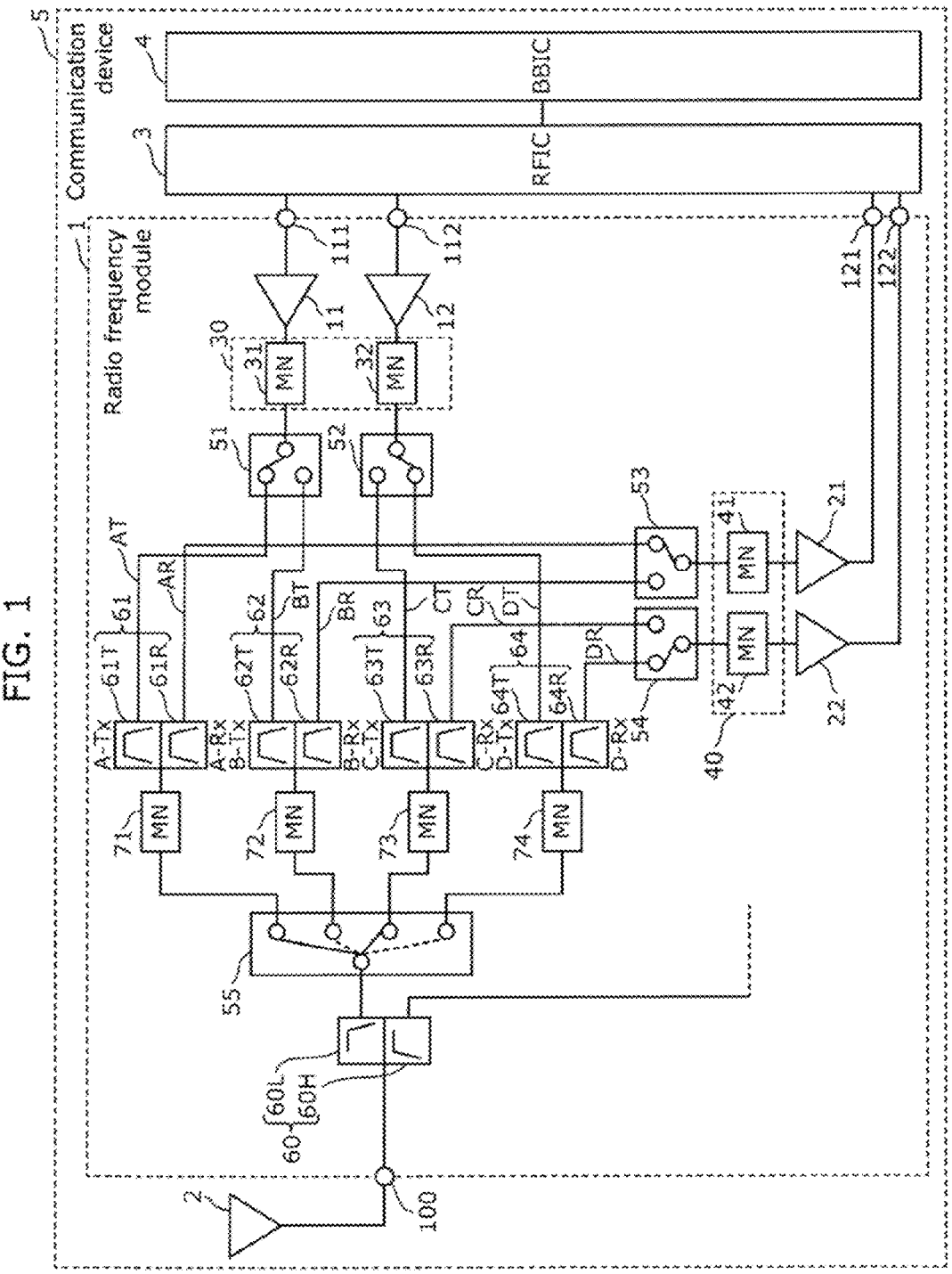
FIG. 1 illustrates a circuit configuration of a radio frequency module according to Embodiment 1.

The following describes in detail embodiments of the present disclosure. Each of the embodiments described below illustrates a general or specific example. The numerical values, shapes, materials, structural components, the arrangement and connection of the structural components, and so on, illustrated in the following embodiments are mere examples, and therefore do not limit the present disclosure. Among the structural components in the following working examples and variations, structural components not recited in the independent claims are described as arbitrary structural components. In addition, the sizes of structural components and the ratios of the sizes in the drawings are not necessarily strictly illustrated. In each of the diagrams, substantially the same structural components are denoted by the same reference signs, and redundant description may be omitted or simplified.

In addition, in the following description, terms indicating relationships between components such as parallel and vertical and terms indicating the shapes of components such as a quadrilateral shape, and numerical ranges do not represent only the strict meanings but include also a substantially equivalent range, such as a difference of approximately several percent.

In addition, in the following description, in an example of A, B, and C being mounted on a board, "in a plan view of the board (or the principal surface of the board), C is disposed between A and B" means that a straight line connecting an arbitrary point in A and an arbitrary point in B passes through a region in C in a plan view of the board. Furthermore, a plan view of the board means that the board and circuit elements mounted on the board are orthographically projected on a plane parallel to the board.

In addition, in the following description, a "transmission path" refers to a transfer path including a line along which a radio frequency transmission signal propagates, an electrode directly connected to the line, a terminal directly connected to the line or the electrode, etc. Furthermore, a "reception path" refers to a transfer path including a line through along a radio frequency reception signal propagates, an electrode directly connected to the line, a terminal directly connected to the line or the electrode, etc. Furthermore, a "signal path" refers to a transfer path including a line along which a radio frequency signal propagates, an electrode directly connected to the line, a terminal directly connected to the line or the electrode, etc.

Embodiment 1

[1.1 Circuit Configuration of Radio Frequency Module 1 and Communication Device 5]

FIG. 1 illustrates a circuit configuration of radio frequency module 1 according to Embodiment 1. As illustrated in FIG. 1, communication device 5 includes radio frequency module 1, antenna 2, radio frequency (RF) signal processing circuit (RF integrated circuit (IC)) 3, and baseband signal processing circuit (BBIC) 4.

RFIC 3 is an RF signal processing circuit that processes a radio frequency signal to be transmitted by antenna 2 and a radio frequency signal received by antenna 2. More specifically, RFIC 3 performs signal processing, by down-conversion or the like, on a reception signal input via the reception path of radio frequency module 1, and outputs the reception signal generated by the signal processing to BBIC 4. In addition, RFIC 3 performs signal processing, by up-conversion or the like, on a transmission signal input from BBIC 4, and outputs the transmission signal generated by the signal processing to the transmission path of radio frequency module 1.

BBIC 4 is a circuit that performs signal processing using an intermediate frequency band having a lower frequency than a frequency band of a radio frequency signal that is transferred through radio frequency module 1. The signal processed by BBIC 4 is, for example, used as an image signal for image display or as a sound signal for telephone conversation via a speaker.

RFIC 3 also functions as a controller that controls the connection of switches 51, 52, 53, 54, and 55 included in radio frequency module 1, based on a communication band (frequency band) used. More specifically, RFIC 3 controllably switches connection(s) between switches 51 to 55 included in radio frequency module 1, by a control signal (not illustrated). It should be noted that the controller may be disposed outside RFIC 3, and may be disposed, for example, in radio frequency module 1 or BBIC 4.

Antenna 2 is connected to antenna connection terminal 100 of radio frequency module 1, emits a radio frequency signal that has been output from radio frequency module 1, receives a radio frequency signal from the outside, and outputs the radio frequency signal to radio frequency module 1.

It should be noted that, in communication device 5 according to the present embodiment, antenna 2 and BBIC 4 are not indispensable components.

Next, a detailed configuration of radio frequency module 1 will be described.

As illustrated in FIG. 1, radio-frequency module 1 includes: antenna connection terminal 100; transmission power amplifiers 11 and 12; reception low noise amplifiers 21 and 22; transmission filters 61T, 62T, 63T, and 64T; reception filters 61R, 62R, 63R, and 64R; transmission output matching circuit 30; reception input matching circuit 40; matching circuits 71, 72, 73, and 74; switches 51, 52, 53, 54, and 55; and diplexer 60.

Antenna connection terminal 100 is a common antenna terminal connected to antenna 2.

Transmission power amplifier 11 is an amplifier that amplifies radio frequency signals of communication band A (a first communication band) and communication band B (a third communication band) that belong to a first frequency band group, which are input from transmission input terminal 111. In addition, transmission power amplifier 12 is an amplifier that amplifies radio frequency signals of communication band C (a second communication band) and communication band D (a fourth communication band) that belong to a second frequency band group different from the first frequency band group. The radio frequency signals are input from transmission input terminal 112.

Reception low noise amplifier 21 is an amplifier that amplifies radio frequency signals of communication band A and communication band B with low noise, and outputs the amplified radio frequency signals to reception output terminal 121. Reception low noise amplifier 22 is an amplifier that amplifies radio frequency signals of communication band C and communication band D with low noise, and outputs the amplified radio frequency signals to reception output terminal 122.

Transmission filter 61T is one example of a first transmission filter, is disposed on transmission path AT connecting transmission power amplifier 11 and antenna connection terminal 100, and passes a transmission signal in a transmission band of communication band A, among the transmission signals that have been amplified by transmission power amplifier 11. Transmission filter 62T is one example of a third transmission filter, is disposed on transmission path BT connecting transmission power amplifier 11 and antenna connection terminal 100, and passes a transmission signal in a transmission band of communication band B, among the transmission signals that have been amplified by transmission power amplifier 11. Transmission filter 63T is one example of a second transmission filter, is disposed on transmission path CT connecting transmission power amplifier 12 and antenna connection terminal 100, and passes a transmission signal in a transmission band of communication band C, among the transmission signals that have been amplified by transmission power amplifier 12. Transmission filter 64T is one example of a fourth transmission filter, is disposed on transmission path DT connecting transmission power amplifier 12 and antenna connection terminal 100, and passes a transmission signal in a transmission band of communication band D, among the transmission signals that have been amplified by transmission power amplifier 12.

Reception filter 61R is one example of a first reception filter, is disposed on reception path AR connecting reception low noise amplifier 21 and antenna connection terminal 100, and passes a reception signal in a reception band of communication band A, among the reception signals that have been input from antenna connection terminal 100. Reception filter 62R is one example of a third reception filter, is disposed on reception path BR connecting reception low noise amplifier 21 and antenna connection terminal 100, and passes a reception signal in a reception band of communication band B, among the reception signals that have been input from antenna connection terminal 100. Reception filter 63R is one example of a second reception filter, is disposed on reception path CR connecting reception low noise amplifier 22 and antenna connection terminal 100, and passes a reception signal in a reception band of communication band C, among the reception signals that have been input from antenna connection terminal 100. Reception filter 64R is one example of a fourth reception filter, is disposed on reception path DR connecting reception low noise amplifier 22 and antenna connection terminal 100, and passes a reception signal in a reception band of communication band D, among the reception signals that have been input from antenna connection terminal 100.

Duplexer 61 is one example of a first duplexer, and includes transmission filter 61T and reception filter 61R. Duplexer 62 is one example of a third duplexer, and includes transmission filter 62T and reception filter 62R. Duplexer 63 is one example of a second duplexer, and includes transmission filter 63T and reception filter 63R. Duplexer 64 is one example of a fourth duplexer, and includes transmission filter 64T and reception filter 64R.

Transmission path AT transfers a transmission signal of communication band A. Transmission path AT has one end connected to an output terminal of transmission power amplifier 11, and the other end connected to antenna connection terminal 100. Transmission path BT transfers a transmission signal of communication band B. Transmission path BT has one end connected to an output terminal of transmission power amplifier 11, and the other end connected to antenna connection terminal 100. Transmission path CT transfers a transmission signal of communication band C. Transmission path CT has one end connected to an output terminal of transmission power amplifier 12, and the other end connected to antenna connection terminal 100. Transmission path DT transfers a transmission signal of communication band D. Transmission path DT has one end connected to an output terminal of transmission power amplifier 12, and the other end connected to antenna connection terminal 100.

Reception path AR transfers a reception signal of communication band A. Reception path AR has one end connected to antenna connection terminal 100, and the other end connected to an input terminal of reception low noise amplifier 21. Reception path BR transfers a reception signal of communication band B. Reception path BR has one end connected to antenna connection terminal 100, and the other end connected to an input terminal of reception low noise amplifier 21. Reception path CR transfers a reception signal of communication band C. Reception path CR has one end connected to antenna connection terminal 100, and the other end connected to an input terminal of reception low noise amplifier 22. Reception path DR transfers a reception signal of communication band D. Reception path DR has one end connected to antenna connection terminal 100, and the other end connected to an input terminal of reception low noise amplifier 22.

Transmission output matching circuit 30 includes matching circuits 31 and 32. Matching circuit 31 is disposed on a transmission path connecting transmission power amplifier 11 and transmission filters 61T and 62T, and matches the impedance of transmission power amplifier 11 with the impedance of transmission filters 61T and 62T. Matching circuit 32 is disposed on a transmission path connecting transmission power amplifier 12 and transmission filters 63T and 64T, and matches the impedance of transmission power amplifier 12 with the impedance of transmission filters 63T and 64T.

Reception input matching circuit 40 includes matching circuits 41 and 42. Matching circuit 41 is disposed on a reception path connecting reception low noise amplifier 21 and reception filters 61R and 62R, and matches the impedance of reception low noise amplifier 21 with the impedance of reception filters 61R and 62R. Matching circuit 42 is disposed on a reception path connecting reception low noise amplifier 22 and reception filters 63R and 64R, and matches the impedance of reception low noise amplifier 22 with the impedance of reception filters 63R and 64R.

Switch 51 includes a common terminal and two selection terminals. The common terminal of switch 51 is connected to the output terminal of transmission power amplifier 11 via matching circuit 31. One of the selection terminals of switch 51 is connected to duplexer 61 disposed on transmission path AT, and the other of the selection terminals of switch 51 is connected to duplexer 62 disposed on transmission path BT. In this connection configuration, switch 51 switches between connecting the common terminal to one of the selection terminals and connecting the common terminal to the other of the selection terminals. In other words, switch 51 switches between connecting and disconnecting transmission power amplifier 11 to/from duplexers 61 and 62. Switch 51 includes, for example, a single pole double throw (SPDT) switching circuit.

Switch 52 includes a common terminal and two selection terminals. The common terminal of switch 52 is connected to the output terminal of transmission power amplifier 12 via matching circuit 32. One of the selection terminals of switch 52 is connected to duplexer 63 disposed on transmission path CT, and the other of the selection terminals of switch 52 is connected to duplexer 64 disposed on transmission path DT. In this connection configuration, switch 52 switches between connecting the common terminal to one of the selection terminals and connecting the common terminal to the other of the selection terminals. In other words, switch 52 switches between connecting and disconnecting transmission power amplifier 12 to/from duplexers 63 and 64. Switch 52 includes, for example, an SPDT switching circuit.

Switch 53 is one example of a first switch, and includes a common terminal and a first selection terminal and a second selection terminal. The common terminal of switch 53 is connected to an input terminal of reception low noise amplifier 21 via matching circuit 41. The first selection terminal of switch 53 is connected to reception filter 61R disposed on reception path AR, and the second selection terminal of switch 53 is connected to reception filter 62R disposed on reception path BR. In this connection configuration, switch 53 switches between connecting the common terminal to the first selection terminal and connecting the common terminal to the second selection terminal. In other words, switch 53 switches between connecting and disconnecting reception low noise amplifier 21 to/from duplexers 61 and 62. Switch 53 includes, for example, an SPDT switching circuit.

Switch 54 includes a common terminal and two selection terminals. The common terminal of switch 54 is connected to an input terminal of reception low noise amplifier 22 via matching circuit 42. One of the selection terminals of switch 54 is connected to reception filter 63R disposed on reception path CR, and the other of the selection terminals of switch 54 is connected to reception filter 64R disposed on reception path DR. In this connection configuration, switch 54 switches between connecting the common terminal to one of the selection terminals and connecting the common terminal to the other of the selection terminals. In other words, switch 54 switches between connecting and disconnecting reception low noise amplifier 22 to/from and duplexers 63 and 64. Switch 54 includes, for example, an SPDT switching circuit.

Switch 55 is one example of an antenna switch, is connected to antenna connection terminal 100 via diplexer 60, and switches between connecting and disconnecting of (1) antenna connection terminal 100 to/from duplexer 61, (2) antenna connection terminal 100 to/from duplexer 62, (3) antenna connection terminal 100 to/from duplexer 63, and (4) antenna connection terminal 100 to/from duplexer 64. It should be noted that switch 55 includes a multiple-connection switching circuit capable of simultaneously connecting two or more of the above-described combinations (1) to (4).

Matching circuit 71 is disposed on a path connecting switch 55 and duplexer 61, and matches the impedance of antenna 2 and switch 55 with the impedance of duplexer 61. Matching circuit 72 is disposed on a path connecting switch 55 and duplexer 62, and matches the impedance of antenna 2 and switch 55 with the impedance of duplexer 62. Matching circuit 73 is disposed on a path connecting switch 55 and duplexer 63, and matches the impedance of antenna 2 and switch 55 with the impedance of duplexer 63. Matching circuit 74 is disposed on a path connecting switch 55 and duplexer 64, and matches the impedance of antenna 2 and switch 55 with the impedance of duplexer 64.

Diplexer 60 is one example of a multiplexer, and includes filters 60L and 60H. Filter 60L is a filter which has, as a passband, a frequency range including the first frequency band group and the second frequency band group. Filter 60H is a filter which has, as a passband, a frequency range including another frequency band group that is different from the first frequency band group and the second frequency band group. One terminal of filter 60L and one terminal of filter 60H are commonly connected to antenna connection terminal 100. Each of filters 60L and 60H is an LC filter including, for example, at least one of a chip inductor or a chip capacitor. It should be noted that, when the first frequency band group and the second frequency band group are lower than the above-described other frequency band group, filter 60L may be a low-pass filter and filter 60H may be a high-pass filter.

It should be noted that the above-described transmission filters 61T to 64T and reception filters 61R to 64R may be, for example, one of an acoustic wave filter using a surface acoustic wave (SAW), an acoustic wave filter using a bulk acoustic wave (BAW), an LC resonant filter, and a dielectric filter, but not limited to these filters.

Transmission power amplifiers 11 and 12 and reception low noise amplifiers 21 to 22 include, for example, a field-effect transistor (FET), a hetero-junction bipolar transistor (HBT), etc. which include a Si complementary metal oxide semiconductor (CMOS) or GaAs as a material.

In addition, reception low noise amplifiers 21 and 22, and switches 53, 54, and 55 may be included in a single semiconductor integrated circuit (IC). Furthermore, the above-described semiconductor IC may further include transmission power amplifiers 11 and 12 and switches 51 and 52. The semiconductor IC includes a CMOS, for example. More specifically, the semiconductor IC is formed by a silicon on insulator (SOI) process. This allows manufacturing the semiconductor ICs at low cost. It should be noted that the semiconductor IC may include at least one of GaAs, SiGe, or GaN. With this, it is possible to output a radio frequency signal having a high-quality amplification performance and noise performance.

It should be noted that matching circuits 31, 32, 41, 42, and 71 to 74, diplexer 60, and switches 51 to 55 are not indispensable components for the radio frequency module according to the present disclosure.

In the configuration of radio frequency module 1 described above, transmission power amplifier 11, matching circuit 31, switch 51, transmission filter 61T, matching circuit 71, switch 55, and filter 60L are included in a first transmission circuit that transfers a transmission signal of communication band A toward antenna connection terminal 100. In addition, filter 60L, switch 55, matching circuit 71, reception filter 61R, switch 53, matching circuit 41, and reception low noise amplifier 21 are included in a first reception circuit that transfers a reception signal of communication band A from antenna 2 via antenna connection terminal 100.

In addition, transmission power amplifier 11, matching circuit 31, switch 51, transmission filter 62T, matching circuit 72, switch 55, and filter 60L are included in a third transmission circuit that transfers a transmission signal of communication band B toward antenna connection terminal 100. In addition, filter 60L, switch 55, matching circuit 72, reception filter 62R, switch 53, matching circuit 41, and reception low noise amplifier 21 are included in a third reception circuit that transfers a reception signal of communication band B from antenna 2 via antenna connection terminal 100.

In addition, transmission power amplifier 12, matching circuit 32, switch 52, transmission filter 63T, matching circuit 73, switch 55, and filter 60L are included in a second transmission circuit that transfers a transmission signal of communication band C toward antenna connection terminal 100. In addition, filter 60L, switch 55, matching circuit 73, reception filter 63R, switch 54, matching circuit 42, and reception low noise amplifier 22 are included in a second reception circuit that transfers a reception signal of communication band C from antenna 2 via antenna connection terminal 100.

In addition, transmission power amplifier 12, matching circuit 32, switch 52, transmission filter 64T, matching circuit 74, switch 55, and filter 60L are included in a fourth transmission circuit that transfers a transmission signal of communication band D toward antenna connection terminal 100. In addition, filter 60L, switch 55, matching circuit 74, reception filter 64R, switch 54, matching circuit 42, and reception low noise amplifier 22 are included in a fourth reception circuit that transfers a reception signal of communication band D from antenna 2 via antenna connection terminal 100.

According to the above-described circuit configuration, radio-frequency module 1 is capable of performing at least one of simultaneously transmitting, simultaneously receiving, or simultaneously transmitting and receiving a radio-frequency signal of either communication band A or communication band B and a radio frequency signal of either communication band C or communication band D.

In addition, radio frequency module 1 does not simultaneously transmit, simultaneously receive, or simultaneously transmit and receive a radio frequency signal of communication band A and a radio frequency signal of communication band B. In addition, radio frequency module 1 does not simultaneously transmit, simultaneously receive, or simultaneously transmit and receive a radio frequency signal of communication band C and a radio frequency signal of communication band D.

It should be noted that, the radio frequency module according to the present disclosure may be implemented without connecting the above-described four transmission circuits and the above-described four reception circuits to antenna connection terminal 100 via switch 55, and the above-described four transmission circuits and the above-described four reception circuits may be connected to antenna 2 via different terminals. Furthermore, it is sufficient if the radio frequency module according to the present disclosure includes at least the first transmission circuit, the first reception circuit, the second transmission circuit, and the second reception circuit.

In addition, in the radio frequency module according to the present disclosure, it is sufficient if the first transmission circuit includes at least transmission power amplifier 11 and duplexer 61. In addition, it is sufficient if the second transmission circuit includes transmission power amplifier 12 and duplexer 63. In addition, it is sufficient if the first reception circuit includes reception low noise amplifier 21 and duplexer 61. In addition, it is sufficient if the second reception circuit includes reception low noise amplifier 22 and duplexer 63.

Here, when the circuit elements included in radio frequency module 1 described above are configured in a single module as a small-sized front-end circuit, for example, the first transmission circuit, the second transmission circuit, the first reception circuit, and the second reception circuit need to be located in proximity to one another. In such a case, there arises a problem that a radio frequency signal of communication band A and a radio frequency signal of communication band C which are simultaneously transmitted, simultaneously received, or simultaneously transmitted and received interfere with each other, leading to deterioration of the isolation between the radio frequency signals which are simultaneously transmitted, simultaneously received, or simultaneously transmitted and received.

For instance, the case where the frequency of a harmonic of a transmission signal of communication band A which has been amplified by transmission power amplifier 11 overlaps at least a portion of the reception band of communication band C can be given as one example. In addition, for instance, the case where the frequency of intermodulation distortion between a transmission signal amplified by transmission power amplifier 11 and a transmission signal amplified by transmission power amplifier 12 overlaps any of the reception bands of communication band A and communication band C can be given as one example. In such cases, when a high-power transmission signal that has been output from transmission power amplifier 11 is transferred through transmission path AT, there arises a problem that magnetic field coupling, electric field coupling, or electromagnetic field coupling occurs between duplexer 61 and duplexer 63, and thereby a harmonic or intermodulation distortion of the transmission signal flows into reception path CR, leading to deterioration of the reception sensitivity of reception path CR. In particular, since duplexers 61 to 64 pass a high-power transmission signal, for example, the above-described harmonic and the above-described intermodulation distortion are generated due to the non-linear action of duplexers 61 to 64, causing a decrease in the reception sensitivity of reception path CR. In addition, the signal quality of a transmission signal output from radio frequency module 1 deteriorates, which is caused when a harmonic of a high-power transmission signal transferred through transmission path AT superposes on the high-power transmission signal.

In contrast, radio frequency module 1 according to the present embodiment has a configuration that reduces electric field coupling, magnetic field coupling, or electromagnetic field coupling between duplexer 61 and duplexer 63. The following describes the configuration of radio frequency module 1 according to the present embodiment that reduces the above-described electric field coupling, the magnetic field coupling, or the electromagnetic field coupling.

[1.2 Arrangement Configuration of Circuit Elements of Radio Frequency Module 1A According to Working Example 1]

Figure 2A:
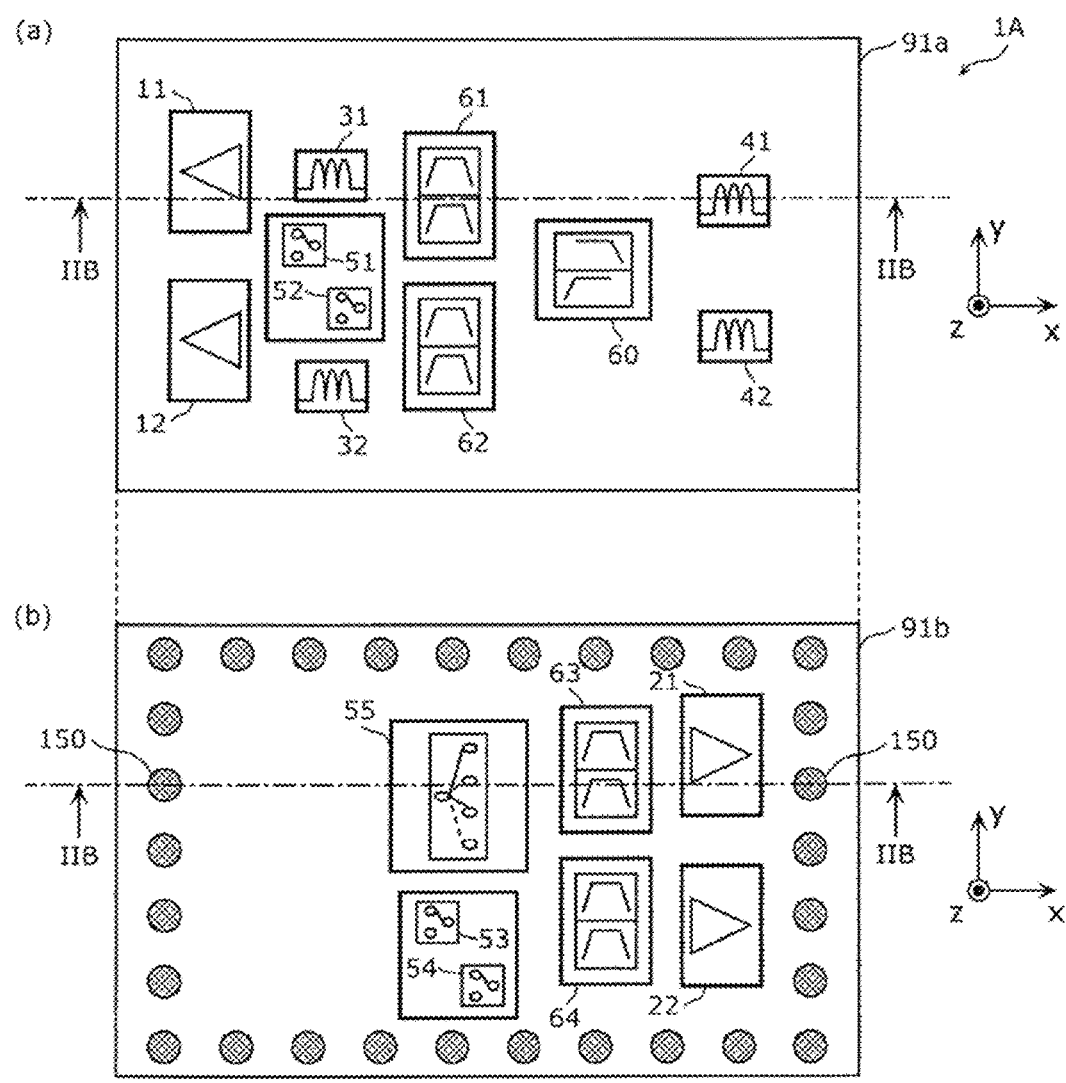
FIG. 2A is a schematic diagram illustrating a plan view configuration of the radio frequency module according to Working Example 1.

FIG. 2A is a schematic diagram illustrating a plan view configuration of radio frequency module 1A according to Working Example 1. FIG. 2B is a schematic diagram illustrating a cross-sectional configuration of radio frequency module 1A according to Working Example 1. More specifically, FIG. 2B is a cross-sectional view taken along line IIB-IIB of FIG. 2A. It should be noted that (a) in FIG. 2A illustrates a layout of the circuit elements when, of principal surfaces 91a and 91b on opposite sides of module board 91, principal surface 91a is viewed from the z-axis positive side. In addition, (b) in FIG. 2A illustrates a perspective view of the layout of the circuit elements when principal surface 91b is viewed from the z-axis positive side.

In radio frequency module 1A according to Working Example 1, the arrangement configuration of the respective circuit elements included in radio frequency module 1 according to Embodiment 1 is specifically illustrated.

As illustrated in FIG. 2A and FIG. 2B, radio frequency module 1A according to the present working example includes module board and resin components 92 and 93 in addition to the circuit configuration illustrated in FIG. 1.

Module board 91 is a board which includes principal surface 91*a* (a first principal surface) and principal surface 91*b* (a second principal surface) on opposite sides thereof, and on which the above-described transmission circuit and the above-described reception circuit are mounted. As module board 91, for example, a low temperature co-fired ceramic (LTCC) board having a stacked structure including a plurality of dielectric layers, a high temperature co-fired ceramic (HTCC) board, a component built-in board, a board including a redistribution layer (RDL), or a printed board or the like is used.

Resin component 92 is disposed on principal surface 91*a* of module board 91 and covers a portion of the above-described transmission circuit, a portion of the above-described reception circuit, and principal surface 91*a* of module board 91. Resin component 92 has a function of ensuring reliability such as mechanical strength and moisture resistance of the circuit elements included in the above-described transmission circuit and the above-described reception circuit. Resin component 93 is disposed on principal surface 91*b* of module board 91 and covers a portion of the above-described transmission circuit, a portion of the above-described reception circuit, and principal surface 91*b* of module board 91. Resin component 93 has a function of ensuring reliability such as mechanical strength and moisture resistance of the circuit elements included in the above-described transmission circuit and the above-described reception circuit. It should be noted that resin components 92 and 93 are not indispensable components for the radio frequency module according to the present disclosure.

As illustrated in FIG. 2A and FIG. 2B, in radio frequency module 1A according to the present working example, duplexers 61 and 62, transmission power amplifiers 11 and 12, switches 51 and 52, matching circuits 31, 32, 41, and 42, and diplexer 60 are surface-mounted on principal surface 91*a* of module board 91. Duplexers 63 and 64, reception low noise amplifiers 21 and 22, and switches 53, 54, and 55 are surface-mounted on principal surface 91*b* of module board 91. It should be noted that, although not illustrated in FIG. 2A or FIG. 2B, matching circuits 71 to 74 may be surface-mounted on any of principal surfaces 91*a* or 91*b* of module board 91, or may be built-in in module board 91.

According to the present working example, duplexer 61 that transfers a transmission signal and a reception signal of communication band A and duplexer 62 that transfers a transmission signal and a reception signal of communication band B are mounted on principal surface 91*a*, and duplexer 63 that transfers a transmission signal and a reception signal of communication band C and duplexer 64 that transfers a transmission signal and a reception signal of communication band D are mounted on principal surface 91*b*.

Here, a radio frequency signal of either communication band A or communication band B and a radio frequency signal of either communication band C or communication band D can be at least one of simultaneously transmitted, simultaneously received, or simultaneously transmitted and received. A radio frequency signal of communication band A and a radio frequency signal of communication band B are not simultaneously transmitted, simultaneously received, or simultaneously transmitted and received. A radio frequency signal of communication band C and a radio frequency signal of communication band D are not simultaneously transmitted, simultaneously received, or simultaneously transmitted and received.

According to the above-described configuration, duplexers 61 and 62 are disposed on principal surface 91*a* of module board 91, and duplexers 63 and 64 are disposed on principal surface 91*b* of module board 91. In other words, duplexers 61 and 62 and duplexers 63 and 64 are arranged with module board 91 interposed therebetween. According to this configuration, it is possible to reduce magnetic field coupling, electric field coupling, or electromagnetic field coupling between duplexers 61 and 62 and duplexers 63 and 64. For that reason, in the case where a radio frequency signal of communication band A and a radio frequency signal of communication band C are simultaneously transmitted, simultaneously received, or simultaneously transmitted and received, it is possible to reduce magnetic field coupling, electric field coupling, or electromagnetic field coupling between duplexers 61 and 63 even when, for example, (i) the frequency of a harmonic of a transmission signal of communication band A which has been amplified by transmission power amplifier 11 overlaps at least a portion of the reception band of communication band C or (ii) the frequency of intermodulation distortion between a transmission signal amplified by transmission power amplifier 11 and a transmission signal amplified by transmission power amplifier 12 overlaps at least a portion of the reception band of communication band C. As a result, it is possible to reduce the deterioration of reception sensitivity of reception path CR, which is caused when a harmonic of the transmission signal or intermodulation distortion between the transmission signals flows into reception path CR. In addition, in the case where a radio frequency signal of communication band B and a radio frequency signal of communication band D are simultaneously transmitted, simultaneously received, or simultaneously transmitted and received, it is possible to reduce magnetic field coupling, electric field coupling, or electromagnetic field coupling between duplexers 62 and 64 even when, for example, (i) the frequency of a harmonic of a transmission signal of communication band B which has been amplified by transmission power amplifier 11 overlaps at least a portion of the reception band of communication band D or (ii) the frequency of intermodulation distortion between a transmission signal amplified by transmission power amplifier 11 and a transmission signal amplified by transmission power amplifier 12 overlaps at least a portion of the reception band of communication band D. As a result, it is possible to reduce the deterioration of reception sensitivity of reception path DR, which is caused when a harmonic of the transmission signal or intermodulation distortion between the transmission signals flows into reception path DR. In addition, it is possible to reduce deterioration of the signal quality of a transmission signal output from radio frequency module 1A, which is caused when a harmonic of a high-power transmission signal that is transferred through transmission output paths AT to DT is superimposed on the high-power transmission signal. More specifically, since interference between a radio frequency signal of communication band A and a radio frequency of communication band C which are simultaneously transmitted, simultaneously received, or simultaneously transmitted and received is reduced, and interference between a radio frequency signal of communication band B and a radio frequency signal of communication band D which are simultaneously transmitted, simultaneously received, or simultaneously transmitted and received is reduced, it is possible to provide radio frequency module 1A with a small size and an improved isolation between radio frequency signals which are simultaneously transmitted, simultaneously received, or simultaneously transmitted and received.

Although a configuration in which duplexers 61 and 62 are mounted on principal surface 91*a* and duplexers 63 and 64 are mounted on principal surface 91*b* has been described as an example in the present working example, it is sufficient for the radio frequency module according to the present disclosure if duplexer 61 and duplexer 63 are arranged with module board 91 interposed therebetween, and other circuit components included in radio frequency module 1A may be disposed on any of principal surfaces 91*a* and 91*b*. Even in this case, two duplexers disposed on signal paths through which radio frequency signals are simultaneously transmitted, simultaneously received, or simultaneously received and received are arranged with module board 91 interposed therebetween, and thus it is possible to improve isolation between two radio frequency signals which are simultaneously transmitted, simultaneously received, or simultaneously received and received.

It should be noted that, switch 55 is disposed on principal surface 91*b* as illustrated in radio frequency module 1A according to the present working example, and it is desirable that a footprint of duplexer 61 overlaps with a footprint of switch 55, and that duplexer 63 and switch 55 are adjacent to each other in a plan view of module board 91.

According to this configuration, switch 55 and duplexer 61 face each other across module board 91, and thus it is possible to reduce the length of a line connecting switch 55 and duplexer 61. In other words, it is possible to reduce transfer loss of radio frequency signals of communication band A. In addition, switch 55 and duplexer 63 are adjacent to each other, and thus it is possible to reduce the length of a line connecting switch 55 and duplexer 63. In other words, it is possible to reduce transfer loss of radio frequency signals of communication band C.

In addition, radio frequency module 1A according to the present working example has a configuration in which switches 51 and 52 are mounted on principal surface 91*a*, and reception low noise amplifiers 21 and 22 and switches 53, 54, and 55 are mounted on principal surface 91*b*.

According to the above-described configuration, switches 51 and 52 disposed on transmission paths AT to DT are arranged on principal surface 91*a* of module board 91, and first circuit components disposed on reception path AR to DR are arranged on principal surface 91*b* of module board 91. According to this configuration, it is possible to reduce electric field coupling, magnetic field coupling, or electromagnetic field coupling between switches 51 and 52 and reception paths AR to DR when high-power transmission signals of communication bands A to D which have been output from transmission power amplifiers 11 and 12 are transferred trough transmission paths AT to DT. For that reason, it is possible to inhibit the transmission signals of communication bands A to D from flowing into reception paths AR to DR without passing through one or more of transmission filters 61T to 64T and switch 55. In addition, it is possible to inhibit a harmonic resulting from non-linear actions of switches 51 and 52, and further, a spurious wave of intermodulation distortion between a transmission signal amplified by transmission power amplifier 11 and a transmission signal amplified by transmission power amplifier 12 from flowing into reception paths AR to DR. As a result, the isolation between the transmission circuit and the reception circuit is improved, and thus it is possible to inhibit the above-described transmission signal, the harmonic, and the spurious wave of intermodulation distortion from flowing into reception path AR to DR to decrease the reception sensitivity.

It should be noted that the first circuit components disposed on principal surface 91*b* are not limited to reception low noise amplifiers 21 and 22 and switches 53, 54, and 55, and may be at least one circuit component (first circuit component) among the circuit components listed below. That is, it is sufficient if at least one of the following (1) to (5) is disposed on principal surface 91*b* as the first circuit component:

(1) reception low noise amplifier 21 or 22;
(2) an inductor of matching circuit 41 or an inductor of matching circuit 42;
(3) switch 53 or 54;
(4) diplexer 60; or
(5) switch 55.

It is desirable that module board 91 have a multilayer structure in which a plurality of dielectric layers are stacked, and that at least one of the plurality of dielectric layers include a ground electrode pattern formed thereon. With this configuration, the electromagnetic field shielding function of module board 91 is improved.

In addition, in radio frequency module 1A according to the present working example, a plurality of external-connection terminals 150 are disposed on principal surface 91*b* of module board 91. Radio frequency module 1A exchanges electrical signals with a motherboard disposed on the z-axis negative side of radio frequency module 1A via the plurality of external-connection terminals 150. In addition, one or some of the plurality of external-connection terminals 150 are set to the ground potential of the motherboard. Of principal surfaces 91*a* and 91*b*, transmission power amplifiers 11 and 12 which are difficult to reduce the height are not disposed on principal surface 91*b* that faces the motherboard, but reception low noise amplifiers 21 and 22 and switches 53, 54, and 55 which are easy to reduce the height are disposed on principal surface 91*b*, and thus it is possible to reduce the height of radio frequency module 1A as a whole. In addition, a plurality of external-connection terminals 150 that are applied as ground electrodes are disposed in the vicinity of reception low noise amplifiers 21 and 22 that significantly affect the reception sensitivity of the reception circuits. As a result, it is possible to reduce the deterioration of reception sensitivity of the reception circuits.

It should be noted that external-connection terminals 150 may be columnar electrodes that penetrate through resin component 93 in the z-axis direction as illustrated in FIG. 2A and FIG. 2B, or bump electrodes formed on principal surface 91*b*.

In addition, in radio frequency module 1A according to the present working example, transmission power amplifiers 11 and 12 are mounted on principal surface 91*a*.

Transmission power amplifiers 11 and 12 are components that generate a large amount of heat among the circuit components included in radio frequency module 1A. In order to improve the heat dissipation property of radio frequency module 1A, it is important to dissipate heat generated by transmission power amplifiers 11 and 12 to the motherboard through a heat dissipation path having a small thermal resistance. If transmission power amplifiers 11 and 12 are mounted on principal surface 91*b*, the electrode lines connected to transmission power amplifiers 11 and 12 are arranged on principal surface 91*b*. For that reason, as the heat dissipation path, a heat dissipation path that passes though only a planar line pattern (along the xy plane direction) on principal surface 91*b* is included. The above-described planar line pattern is formed using a metal thin film, and thus has a large thermal resistance. For that reason, when transmission power amplifiers 11 and 12 are disposed on principal surface 91b, the heat dissipation property is decreased.

In contrast, when transmission power amplifiers 11 and 12 are mounted on principal surface 91a, it is possible to connect transmission power amplifiers 11 and 12 to external-connection terminals 150 via penetrating electrodes that penetrate through module board 91 between principal surface 91a and principal surface 91b. As a result, it is possible to exclude a heat dissipation path that passes through only the planar line pattern along the xy plane direction which has a large thermal resistance, from among the lines in module board 91 as the heat dissipation paths for transmission power amplifiers 11 and 12. It is thus possible to provide radio frequency module 1A having an improved heat dissipation property for dissipating heat from transmission power amplifiers 11 and 12 to the motherboard.

In addition, according to the above-described configuration that improves the heat dissipation property of radio frequency module 1A, the external-connection terminals or the like for the purpose of heat dissipation are disposed on principal surface 91b in a region that faces transmission power amplifiers 11 and 12 in the z-axis direction, and thus the layout of circuit components is restricted. Meanwhile, since high-power transmission signals are transferred through the transmission path connecting transmission power amplifier 11 and switch 51, it is desirable that the length of the transmission path is reduced as much as possible. From this perspective, it is desirable that transmission power amplifier 11 and switch 51 be disposed so as to face each other across module board 91. However, due to the above-described restriction, it is difficult to disposed switch 51 to face transmission power amplifier 11 across module board 91. Accordingly, it is desirable that switch 51 be mounted on principal surface 91a on which transmission power amplifier 11 is mounted so as to be adjacent to transmission power amplifier 11.

In addition, in a plan view of module board 91, it is desirable that a footprint of switch 53 mounted on principal surface 91b does not overlap with a footprint of transmission power amplifier 11 mounted on principal surface 91a, and that a footprint of switch 51 mounted on principal surface 91a does not overlap with a footprint of switch 53 mounted on principal surface 91b.

According to the above-described configuration, not only switch 53 and transmission power amplifier 11 are arranged with module board 91 interposed therebetween, but also it is possible to ensure a large distance between switch 53 and transmission power amplifier 11. In addition, not only switch 53 disposed on the reception path and switch 51 disposed on the transmission path are arranged with module board 91 interposed therebetween, but also it is possible to ensure a large distance between switch 53 and switch 51. As a result, the isolation between the transmission circuit and the reception circuit is further improved, and thus it is possible to inhibit a transmission signal, a harmonic, and a spurious wave of intermodulation distortion from flowing into the reception path to decrease the reception sensitivity.

In addition, as illustrated in radio frequency module 1A according to the present working example, it is desirable that, in a plan view of module board 91, transmission power amplifier 11, switch 51, and duplexer 61 (or transmission filter 61T) or 62 (or transmission filter 62T) be disposed on principal surface 91a in stated order. According to this configuration, transmission power amplifier 11, switch 51, and duplexer 61 or 62 are disposed on principal surface 91a in the same order as the order of electrical connection. This allows reducing the length of the line connecting transmission power amplifier 11, switch 51, and duplexer 61 or 62. As a result, it is possible to reduce transfer loss in the transmission path.

It should be noted that reception low noise amplifiers 21 and 22 and switches 53, 54, and 55 may be built in a single semiconductor IC. According to the above-described configuration, it possible to reduce the height on principal surface 91b side in the z-axis direction, and also reduce the component mounting area of principal surface 91b. As a result, it is possible to downsize radio frequency module 1A.

Embodiment 2

[2.1 Circuit Configuration of Radio Frequency Module 6 and Communication Device 7]

Figure 3:
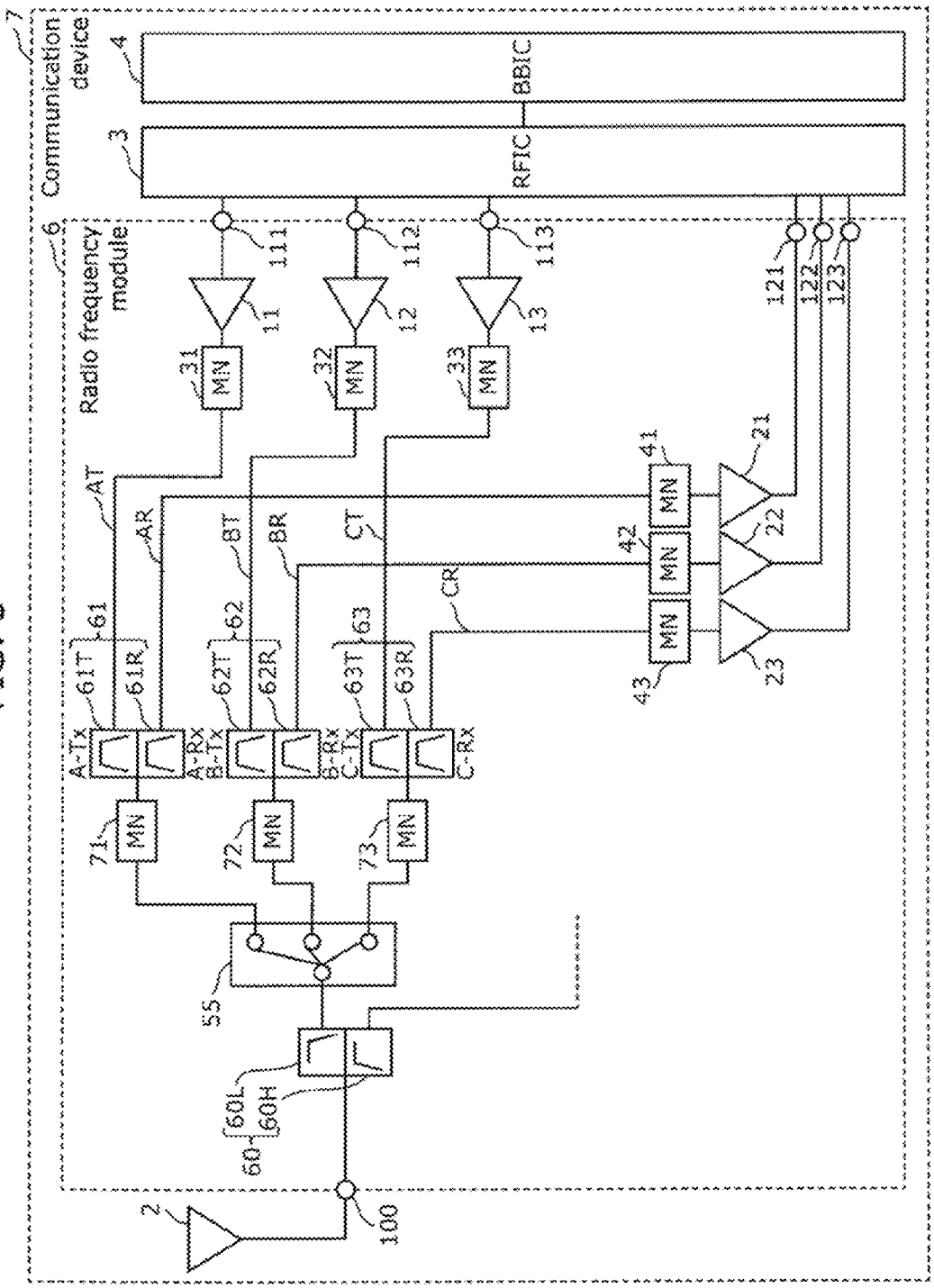
FIG. 3 illustrates a circuit configuration of a radio frequency module according to Embodiment 2.

FIG. 3 illustrates a circuit configuration of radio frequency module 6 according to Embodiment 2. As illustrated in the diagram, communication device 7 includes radio frequency module 6, antenna 2, RFIC 3, and BBIC 4. Communication device 7 according to the present embodiment is different from communication device 5 according to Embodiment 1 in the circuit configuration of radio frequency module 6. The following describes communication device 7 according to the present embodiment, focusing on the circuit configuration of radio frequency module 6.

As illustrated in FIG. 3, radio frequency module 6 includes: antenna connection terminal 100; transmission power amplifiers 11, 12, and 13; reception low noise amplifiers 21, 22, and 23; transmission filters 61T, 62T, and 63T; reception filters 61R, 62R, and 63R; matching circuits 31, 32, 33, 41, 42, 43, 71, 72, and 73; switch 55; and diplexer 60. Radio frequency module 6 according to the present embodiment is different from radio frequency module 1 according to Embodiment 1 in the total number of transmission paths and the total number of reception paths. Hereinafter, radio frequency module 6 according to the present embodiment will be described. In the description, the same points as those of radio frequency module 1 according to Embodiment 1 will be omitted, and different points will be mainly described.

Transmission power amplifier 11 is an amplifier that amplifies a radio frequency signal of communication band A (a first communication band) which has been input from transmission input terminal 111. Transmission power amplifier 12 is an amplifier that amplifies a radio frequency signal of communication band B (a fifth communication band) which has been input from transmission input terminal 112. Transmission power amplifier 13 is an amplifier that amplifies a radio frequency signal of communication band C (a second communication band) which has been input from transmission input terminal 113.

Reception low noise amplifier 21 is an amplifier that amplifies a radio frequency signal of communication band A with low noise, and outputs the amplified radio frequency signal to reception output terminal 121. Reception low noise amplifier 22 is an amplifier that amplifies a radio frequency signal of communication band B with low noise, and outputs the amplified radio frequency signal to reception output terminal 122. Reception low noise amplifier 23 is an amplifier that amplifies a radio frequency signal of communication band C with low noise, and outputs the amplified radio frequency signal to reception output terminal 123.

Transmission filter 61T is one example of a first transmission filter, is disposed on transmission path AT that connects transmission power amplifier 11 and antenna connection terminal 100, and passes a transmission signal in a transmission band of communication band A, among the transmission signals that have been amplified by transmission power amplifier 11. Transmission filter 62T is one example of a fifth transmission filter, is disposed on transmission path BT that connects transmission power amplifier 12 and antenna connection terminal 100, and passes a transmission signal in a transmission band of communication band B, among the transmission signals that have been amplified by transmission power amplifier 12. Transmission filter 63T is one example of a second transmission filter, is disposed on transmission path CT that connects transmission power amplifier 13 and antenna connection terminal 100, and passes a transmission signal in a transmission band of communication band C, among the transmission signals that have been amplified by transmission power amplifier 13.

Reception filter 61R is one example of a first reception filter, is disposed on reception path AR that connects reception low noise amplifier 21 and antenna connection terminal 100, and passes a reception signal in a reception band of communication band A, among the reception signals that have been input from antenna connection terminal 100. Reception filter 62R is one example of a fifth reception filter, is disposed on reception path BR that connects reception low noise amplifier 22 and antenna connection terminal 100, and passes a reception signal in a reception band of communication band B, among the reception signals that have been input from antenna connection terminal 100. Reception filter 63R is one example of a second reception filter, is disposed on reception path CR that connects reception low noise amplifier 23 and antenna connection terminal 100, and passes a reception signal in a reception band of communication band C, among the reception signals that have been input from antenna connection terminal 100.

Duplexer 61 is one example of a first duplexer, and includes transmission filter 61T and reception filter 61R. Duplexer 62 is one example of a fifth duplexer, and includes transmission filter 62T and reception filter 62R. Duplexer 63 is one example of a second duplexer, and includes transmission filter 63T and reception filter 63R.

Transmission path AT transfers a transmission signal of communication band A. Transmission path AT has one end connected to an output terminal of transmission power amplifier 11, and the other end connected to antenna connection terminal 100. Transmission path BT transfers a transmission signal of communication band B. Transmission path BT has one end connected to an output terminal of transmission power amplifier 12, and the other end connected to antenna connection terminal 100. Transmission path CT transfers a transmission signal of communication band C. Transmission path CT has one end connected to an output terminal of transmission power amplifier 13, and the other end connected to antenna connection terminal 100.

Reception path AR transfers a reception signal of communication band A. Reception path AR has one end connected to antenna connection terminal 100, and the other end connected to an input terminal of reception low noise amplifier 21. Reception path BR transfers a reception signal of communication band B. Reception path BR has one end connected to antenna connection terminal 100, and the other end connected to an input terminal of reception low noise amplifier 22. Through reception path CR, a reception signal of communication band C is transferred. Reception path CR has one end connected to antenna connection terminal 100, and the other end connected to an input terminal of reception low noise amplifier 23.

Matching circuit 31 is disposed on transmission path AT connecting transmission power amplifier 11 and transmission filter 61T, and matches the impedance of transmission power amplifier 11 with the impedance of transmission filter 61T. Matching circuit 32 is disposed on transmission path BT connecting transmission power amplifier 12 and transmission filter 62T, and matches the impedance of transmission power amplifier 12 with the impedance of transmission filter 62T. Matching circuit 33 is disposed on transmission path CT connecting transmission power amplifier 13 and transmission filter 63T, and matches the impedance of transmission power amplifier 13 with the impedance of transmission filter 63T.

Matching circuit 41 is disposed on reception path AR connecting reception low noise amplifier 21 and reception filter 61R, and matches the impedance of reception low noise amplifier 21 with the impedance of reception filter 61R. Matching circuit 42 is disposed on reception path BR connecting reception low noise amplifier 22 and reception filter 62R, and matches the impedance of reception low noise amplifier 22 with the impedance of reception filter 62R. Matching circuit 43 is disposed on reception path CR connecting reception low noise amplifier 23 and reception filter 63R, and matches the impedance of reception low noise amplifier 23 with the impedance of reception filter 63R.

Switch 55 is one example of an antenna switch and connected to antenna connection terminal 100 via diplexer 60. Switch 55 switches between connecting and disconnecting of (1) antenna connection terminal 100 to/from duplexer 61, (2) antenna connection terminal 100 to/from duplexer 62, and (3) antenna connection terminal 100 to/from duplexer 63. It should be noted that switch 55 includes a multiple-connection switching circuit capable of simultaneously performing the connecting of two or more of the above-described combinations indicated in (1) to (3).

In the configuration of radio frequency module 6 described above, transmission power amplifier 11, matching circuit 31, transmission filter 61T, matching circuit 71, switch 55, and filter 60L are included in a first transmission circuit that transfers a transmission signal of communication band A toward antenna connection terminal 100. In addition, filter 60L, switch 55, matching circuit 71, reception filter 61R, matching circuit 41, and reception low noise amplifier 21 are included in a first reception circuit that transfers a reception signal of communication band A from antenna 2 via antenna connection terminal 100.

In addition, transmission power amplifier 11, matching circuit 31, transmission filter 62T, matching circuit 72, switch 55, and filter 60L are included in a fifth transmission circuit that transfers a transmission signal of communication band B toward antenna connection terminal 100. In addition, filter 60L, switch 55, matching circuit 72, reception filter 62R, matching circuit 41, and reception low noise amplifier 21 are included in a fifth reception circuit that transfers a reception signal of communication band B from antenna 2 via antenna connection terminal 100.

In addition, transmission power amplifier 12, matching circuit 32, transmission filter 63T, matching circuit 73, switch 55, and filter 60L are included in a second transmission circuit that transfers a transmission signal of communication band C toward antenna connection terminal 100. In addition, filter 60L, switch 55, matching circuit 73, reception filter 63R, matching circuit 42, and reception low noise amplifier 22 are included in a second reception circuit that transfers a reception signal of communication band C from antenna 2 via antenna connection terminal 100.

According to the above-described circuit configuration, radio-frequency module 6 is capable of performing at least one of simultaneously transmitting, simultaneously receiving, or simultaneously transmitting and receiving a radio-frequency signal of either communication band A or communication band B and a radio frequency signal of either communication band C or communication band D.

In addition, in the radio frequency module according to the present disclosure, it is sufficient if the first transmission circuit includes at least transmission power amplifier 11 and duplexer 61. In addition, it is sufficient if the fifth transmission circuit includes transmission power amplifier 12 and duplexer 62. In addition, it is sufficient if the second transmission circuit includes transmission power amplifier 13 and duplexer 63. In addition, it is sufficient if the first reception circuit includes reception low noise amplifier 21 and duplexer 61. In addition, it is sufficient if the fifth reception circuit includes reception low noise amplifier 22 and duplexer 62. In addition, it is sufficient if the second reception circuit includes reception low noise amplifier 23 and duplexer 63.

[2.2 Arrangement Configuration of Circuit Elements of Radio Frequency Module 6A According to Working Example 2]

Figure 4A:
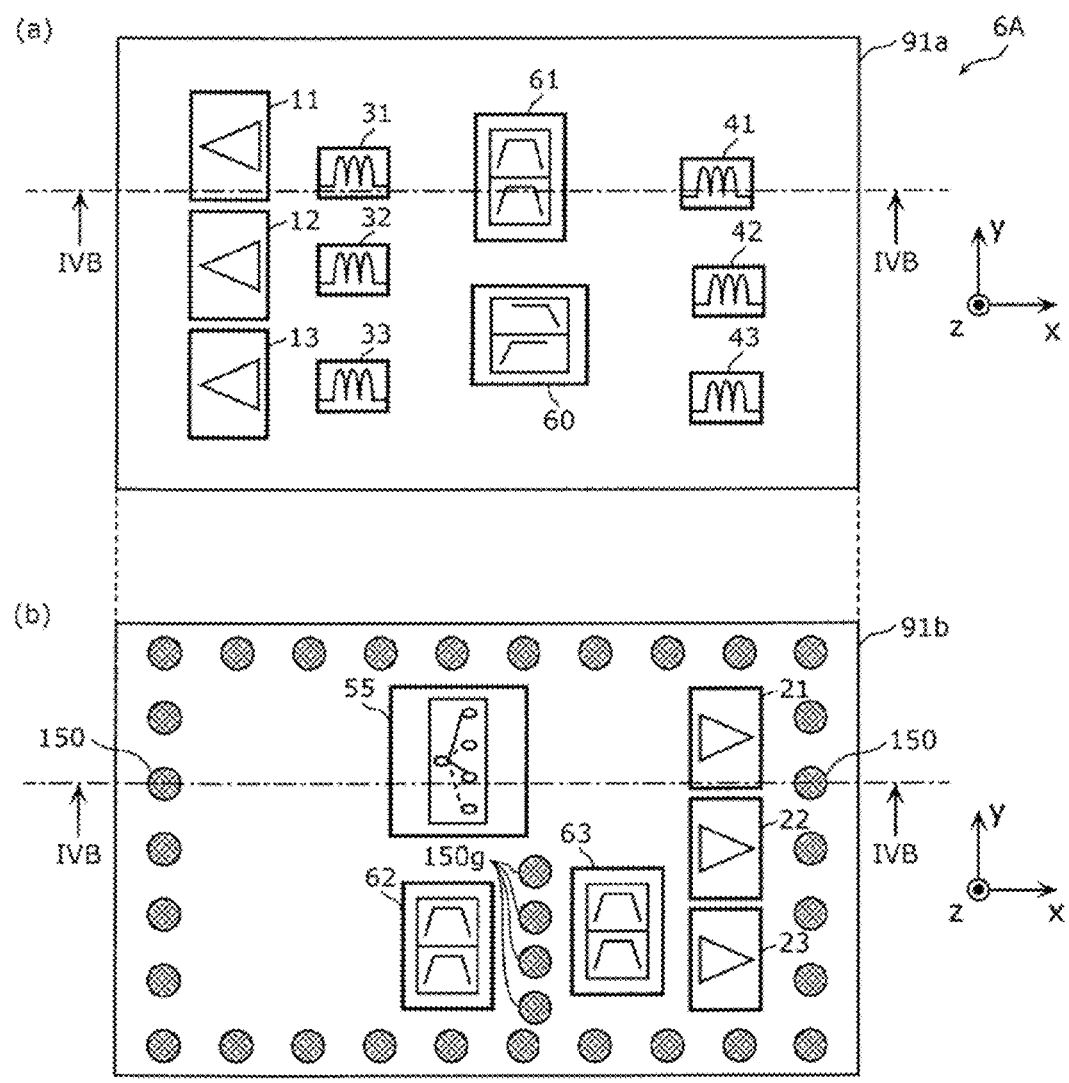
FIG. 4A is a schematic diagram illustrating a plan view configuration of the radio frequency module according to Working Example 2.
Figure 4B:
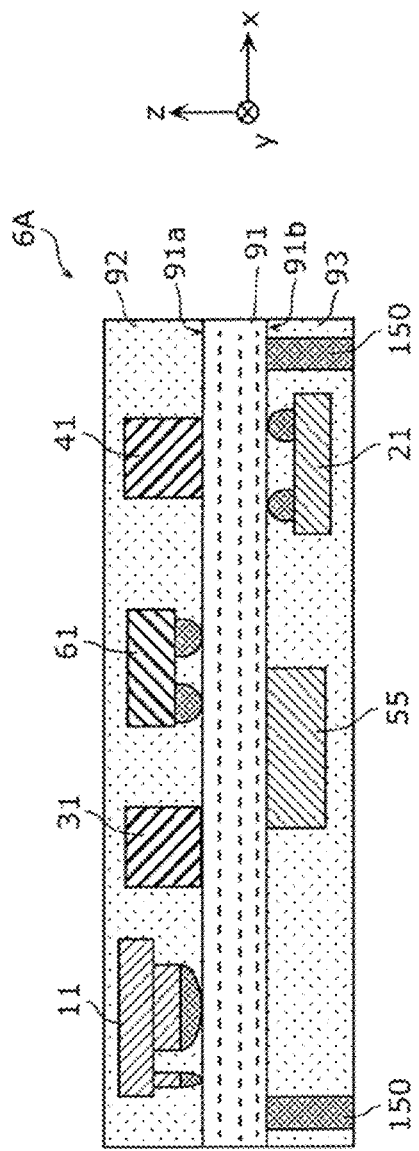
FIG. 4B is a schematic diagram illustrating a cross-sectional configuration of the radio frequency module according to Working example 2.

FIG. 4A is a schematic diagram illustrating a plan view configuration of radio frequency module 6A according to Working Example 2. FIG. 4B is a schematic diagram illustrating a cross-sectional configuration of radio frequency module 6A according to Working Example 2. More specifically, FIG. 4B is a cross-sectional view taken along line IVB-IVB of FIG. 4A. It should be noted that (a) in FIG. 4A illustrates a layout of the circuit elements when, of principal surfaces 91a and 91b located on opposite sides of module board 91, principal surface 91a is viewed from the z-axis positive side. Meanwhile, (b) in FIG. 4A illustrates a perspective view of the layout of the circuit elements when principal surface 91b is viewed from the z-axis positive side.

In radio frequency module 6A according to Working Example 2, the arrangement configuration of the respective circuit elements included in radio frequency module 6 according to Embodiment 2 is specifically illustrated.

As illustrated in FIG. 4A and FIG. 4B, radio frequency module 6A according to the present working example includes module board and resin components 92 and 93 in addition to the circuit configuration illustrated in FIG. 3.

Module board 91 is a board which includes principal surface 91a (a first principal surface) and principal surface 91b (a second principal surface) on opposite sides thereof, and on which the above-described transmission circuit and the above-described reception circuit are mounted. As module board 91, for example, an LTCC board having a stacked structure including a plurality of dielectric layers, an HTCC board, a component built-in board, an RDL, or a printed board or the like is used.

Resin component 92 is disposed on principal surface 91a of module board 91 and covers a portion of the above-described transmission circuit, a portion of the above-described reception circuit, and principal surface 91a of module board 91. Resin component 92 has a function of ensuring reliability such as mechanical strength and moisture resistance of the circuit elements included in the above-described transmission circuit and the above-described reception circuit. Resin component 93 is disposed on principal surface 91b of module board 91 and covers a portion of the above-described transmission circuit, a portion of the above-described reception circuit, and principal surface 91b of module board 91. Resin component 93 has a function of ensuring reliability such as mechanical strength and moisture resistance of the circuit elements included in the above-described transmission circuit and the above-described reception circuit. It should be noted that resin components 92 and 93 are not indispensable components for the radio frequency module according to the present disclosure.

As illustrated in FIG. 4A and FIG. 4B, in radio frequency module 6A according to the present working example, duplexer 61, transmission power amplifiers 11, 12, and 13, matching circuits 31 to 33 and 41 to 43, and diplexer 60 are surface-mounted on principal surface 91a of module board 91. Duplexers 62 and 63, reception low noise amplifiers 21, 22, and 23, and switch 55 are surface-mounted on principal surface 91b of module board 91. It should be noted that, although not illustrated in FIG. 4A and FIG. 4B, matching circuits 71 to 73 may be surface-mounted on any of principal surfaces 91a or 91b of module board 91, or may be built-in in module board 91.

According to the present working example, duplexer 61 (the first duplexer) that transfers a transmission signal and a reception signal of communication band A is mounted on principal surface 91a, and duplexer 62 (the fifth duplexer) that transfers a transmission signal and a reception signal of communication band B and duplexer 63 (the second duplexer) that transfers a transmission signal and a reception signal of communication band C are mounted on principal surface 91b. In addition, in a plan view of module board 91, external-connection terminals 150g each having a ground potential are disposed between duplexer 62 and duplexer 63. External-connection terminals 150g are disposed on principal surface 91b and connected to a motherboard.

Here, a radio frequency signal of communication band A, a radio frequency signal of band B, and a radio frequency signal of communication band C can be at least one of simultaneously transmitted, simultaneously received, or simultaneously transmitted and received.

According to the above-described configuration, duplexer 61 is disposed on principal surface 91a of module board 91, and duplexers 62 and 63 are disposed on principal surface 91b of module board 91. In other words, duplexer 61 and duplexers 62 and 63 are arranged with module board 91 interposed therebetween. According to this configuration, it is possible to reduce magnetic field coupling, electric field coupling, or electromagnetic field coupling between duplexer 61 and duplexers 62 and 63. In addition, on principal surface 91b, external-connection terminals 150g each having a ground potential are disposed between duplexer 62 and duplexer 63. According to this configuration, it is possible to reduce magnetic field coupling, electric field coupling, or electromagnetic field coupling between duplexer 62 and duplexer 63.

For that reason, in the case where a radio frequency signal of communication band A, a radio frequency signal of communication band B, and a radio frequency signal of communication band C are simultaneously transmitted, simultaneously received, or simultaneously transmitted and received, it is possible to reduce magnetic field coupling, electric field coupling, or electromagnetic field coupling between duplexers 61, 62, and 63 even when, for example, (i) the frequency of a harmonic of a transmission signal of communication band A which has been amplified by transmission power amplifier 11 overlaps at least a portion of the reception band of communication band B or C or (ii) the frequency of intermodulation distortion between a transmission signal amplified by transmission power amplifier 11 and a transmission signal amplified by transmission power amplifier 12 or 13 overlaps at least a portion of the reception band of communication band B or C. As a result, it is possible to reduce the deterioration of reception sensitivity of reception paths BR or CR, which is caused when a harmonic of the transmission signal or intermodulation distortion between the transmission signals flows into reception path BR or CR. In addition, it is possible to reduce deterioration of the signal quality of a transmission signal output from radio frequency module 6A, which is caused when a harmonic of a high-power transmission signal that is transferred through transmission output paths AT to CT is superimposed on the high-power transmission signal. More specifically, since interference between a radio frequency signal of communication band A, a radio frequency of communication band B, and a radio frequency of communication band C which are simultaneously transmitted, simultaneously received, or simultaneously transmitted and received is reduced, it is possible to provide radio frequency module 6A with a small size and an improved isolation between the radio frequency signals which are simultaneously transmitted, simultaneously received, or simultaneously transmitted and received.

Although a configuration in which duplexer 61 is mounted on principal surface 91a and duplexers 62 and 63 are mounted on principal surface 91b has been described as an example in the present working example, it is sufficient for the radio frequency module according to the present disclosure if duplexer 61 and duplexers 62 and 63 are arranged with module board 91 interposed therebetween, and other circuit components included in radio frequency module 6A may be disposed on any of principal surfaces 91a and 91b. In this case as well, it is possible to improve the isolation between the three radio frequency signals that are simultaneously transmitted, simultaneously received, or simultaneously transmitted and received.

It should be noted that, switch 55 is disposed on principal surface 91b as illustrated in radio frequency module 6A according to the present working example, and it is desirable that a footprint of duplexer 61 overlaps with a footprint of switch 55, and that duplexer 62, duplexer 63, and switch 55 are adjacent to each other in a plan view of module board 91.

According to this configuration, switch 55 and duplexer 61 face each other across module board 91, and thus it is possible to reduce the length of a line connecting switch 55 and duplexer 61. In other words, it is possible to reduce transfer loss of radio frequency signals of communication band A. In addition, switch 55 and duplexers 62 and 63 are adjacent to each other, and thus it is possible to reduce the length of a line connecting switch 55 and duplexer 62 and the length of a line connecting switch 55 and duplexer 63. In other words, it is possible to reduce transfer loss of radio frequency signals of communication bands B and C.

[2.3 Arrangement Configuration of Circuit Elements of Radio Frequency Module 6B According to Working Example 3]

Figure 5A:
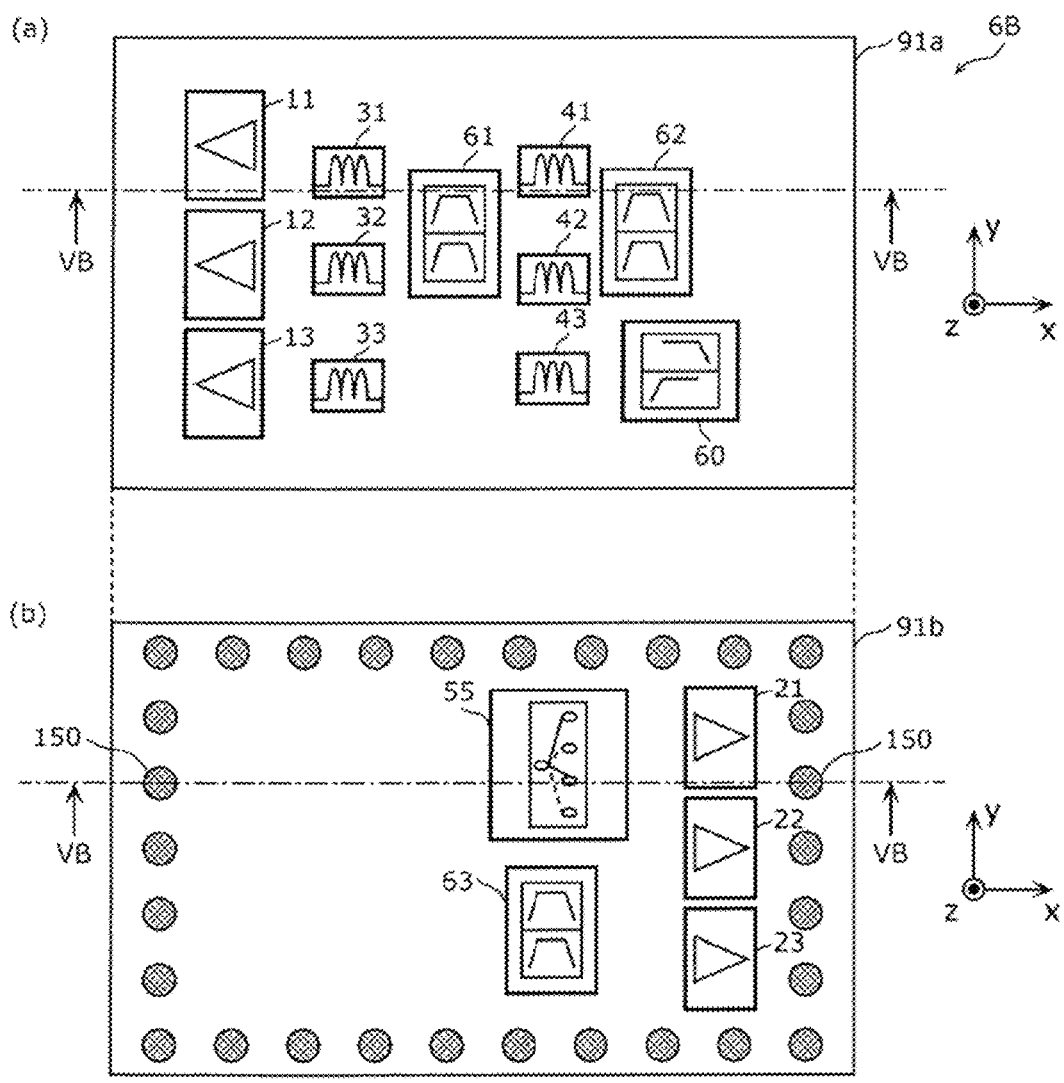
FIG. 5A is a schematic diagram illustrating a plan view configuration of the radio frequency module according to Working Example 3.

FIG. 5A is a schematic diagram illustrating a plan view configuration of radio frequency module 6B according to Working Example 3. FIG. 5B is a schematic diagram illustrating a cross-sectional configuration of radio frequency module 6B according to Working Example 3. More specifically, FIG. 5B is a cross-sectional view taken along line VB-VB of FIG. 5A. It should be noted that (a) in FIG. 5A illustrates a layout of the circuit elements when, of principal surfaces 91a and 91b located on opposite sides of module board 91, principal surface 91a is viewed from the z-axis positive side. Meanwhile, (b) in FIG. 5A illustrates a perspective view of the layout of the circuit elements when principal surface 91b is viewed from the z-axis positive side.

Radio frequency module 6B according to Working Example 3 specifically illustrates the arrangement configuration of the respective circuit elements included in radio frequency module 6 according to Embodiment 2.

Radio frequency module 6B according to the present working example is different from radio frequency module 6A according to Working Example 2 only in the arrangement configuration of the circuit elements included in radio frequency module 6B. Hereinafter, radio frequency module 6B according to the present working example will be described. In the description, the same points as those of radio frequency module 6A according to Working Example 2 will be omitted, and different points will be mainly described.

As illustrated in FIG. 5A and FIG. 5B, radio frequency module 6B according to the present working example includes module board and resin components 92 and 93 in addition to the circuit configuration illustrated in FIG. 3.

As illustrated in FIG. 5A and FIG. 5B, in radio frequency module 6B according to the present working example, duplexers 61 and 62, transmission power amplifier 11, 12, and 13, matching circuits 31 to 33 and 41 to 43, and diplexer 60 are surface-mounted on principal surface 91a of module board 91. Duplexer 63, reception low noise amplifiers 21, 22, and 23, and switch 55 are surface-mounted on principal surface 91b of module board 91. It should be noted that, although not illustrated in FIG. 5A and FIG. 5B, matching circuits 71 to 73 may be surface-mounted on any of principal surfaces 91a or 91b of module board 91, or may be built-in in module board 91.

Matching circuits 41 to 43 each include a chip inductor.

According to the present working example, duplexer 61 (the first duplexer) that transfers a transmission signal and a reception signal of communication band A and duplexer 62 (the fifth duplexer) that transfers a transmission signal and a reception signal of communication band B are mounted on principal surface 91a, and duplexer 63 (the second duplexer) that transfers a transmission signal and a reception signal of communication band C is mounted on principal surface 91b. In addition, in a plan view of module board 91, an inductor of matching circuit 41 and an inductor of matching circuit 42 are disposed between duplexer 61 and duplexer 62.

Here, a radio frequency signal of communication band A, a radio frequency signal of band B, and a radio frequency signal of communication band C can be at least one of simultaneously transmitted, simultaneously received, or simultaneously transmitted and received.

According to the above-described configuration, duplexers 61 and 62 are disposed on principal surface 91a of module board 91, and duplexer 63 is disposed on principal surface 91b of module board 91. In other words, duplexers 61 and 62 and duplexer 63 are arranged with module board 91 interposed therebetween. According to this configuration, it is possible to reduce magnetic field coupling, electric field coupling, or electromagnetic field coupling between duplexers 61 and 62 and duplexer 63. Furthermore, on principal surface 91a, chip inductors are disposed between duplexer 61 and duplexer 62. According to this configuration, since conductive members intervene between duplexer 61 and duplexer 62, it is possible to reduce magnetic field coupling, electric field coupling, or electromagnetic field coupling between duplexer 61 and duplexer 62.

For that reason, in the case where a radio frequency signal of communication band A, a radio frequency signal of communication band B, and a radio frequency signal of communication band C are simultaneously transmitted, simultaneously received, or simultaneously transmitted and received, it is possible to reduce magnetic field coupling, electric field coupling, or electromagnetic field coupling between duplexers 61, 62, and 63 even when, for example, (i) the frequency of a harmonic of a transmission signal of communication band A which has been amplified by transmission power amplifier 11 overlaps at least a portion of the reception band of communication band B or C or (ii) the frequency of intermodulation distortion between a transmission signal amplified by transmission power amplifier 11 and a transmission signal amplified by transmission power amplifier 12 or 13 overlaps at least a portion of the reception band of communication band B or C. As a result, it is possible to reduce the deterioration of reception sensitivity of reception paths BR or CR which is caused when a harmonic of the transmission signal or intermodulation distortion between the transmission signals flows into reception path BR or CR. In addition, it is possible to reduce deterioration of the signal quality of a transmission signal output from radio frequency module 6B which is caused when a harmonic of a high-power transmission signal that is transferred through transmission output paths AT to CT is superimposed on the high-power transmission signal. More specifically, since interference between a radio frequency signal of communication band A, a radio frequency of communication band B, and a radio frequency of communication band C which are simultaneously transmitted, simultaneously received, or simultaneously transmitted and received is reduced, it is possible to provide radio frequency module 6B with a small size and an improved isolation between the radio frequency signals which are simultaneously transmitted, simultaneously received, or simultaneously transmitted and received.

It should be noted that the conductive members disposed between duplexer 61 and duplexer 62 on principal surface 91a are not limited to the inductor of matching circuit 41 and the inductor of matching circuit 42, and may be at least one of the conductive members listed below. That is, the conductive member may be at least one of:
(1) switch 55;
(2) a switch that switches between conduction and non-conduction between duplexer 61 or 62 and reception low noise amplifier 21 or 22;
(3) diplexer 60;
(4) a metallic conductor having one of a block shape, a plate shape, and a wire shape;
(5) a chip capacitor;
(6) a chip inductor; and
(7) a control circuit that generates at least one of a control signal that adjusts a gain of reception low noise amplifiers 21 to 23 or a control signal that controls switching of switch 55.

It is desirable that module board 91 have a multilayer structure in which a plurality of dielectric layers are stacked, and that at least one of the plurality of dielectric layers include a ground electrode pattern formed thereon. With this configuration, the electromagnetic field shielding function of module board 91 is improved. In addition, the above-described ground electrode pattern and the above-described conductive member may be connected to each other.

Although a configuration in which duplexers 61 and 62 are mounted on principal surface 91a and duplexer 63 is mounted on principal surface 91b has been described as an example in the present working example, it is sufficient for the radio frequency module according to the present disclosure if duplexers 61 and 62 and duplexer 63 are arranged with module board 91 interposed therebetween, and the other circuit components included in radio frequency module 6B may be disposed on any of principal surfaces 91a and 91b. In this case as well, it is possible to improve the isolation between the three radio frequency signals that are simultaneously transmitted, simultaneously received, or simultaneously transmitted and received.

(Advantageous Effects, Etc.)

As described above, radio frequency module 1 according to Embodiment 1 is capable of at least one of simultaneously transmitting, simultaneously receiving, or simultaneously transmitting and receiving a radio frequency signal of communication band A and a radio frequency signal of communication band C. Radio frequency module 1 includes: module board 91 including principal surface 91a and principal surface 91b on opposite sides of module board 91; duplexer 61 having, as pass bands, a transmission band and a reception band of communication band A; and duplexer 63 having, as pass bands, a transmission band and a reception band of communication band C. Duplexer 61 is disposed on principal surface 91a and duplexer 63 is disposed on principal surface 91b.

According to the above-described configuration, since duplexer 61 and duplexer 63 are disposed with module board 91 interposed therebetween, it is possible to reduce magnetic field coupling, electric field coupling, or electromagnetic field coupling between duplexer 61 and duplexer 63. For that reason, in the case where a radio frequency signal of communication band A and a radio frequency signal of communication band C are simultaneously transmitted, simultaneously received, or simultaneously transmitted and received, it is possible to reduce magnetic field coupling, electric field coupling, or electromagnetic field coupling between duplexers 61 and 63 even when, for example, (i) the frequency of a harmonic of a transmission signal of communication band A which has been amplified by transmission power amplifier 11 overlaps at least a portion of the reception band of communication band C or (ii) the frequency of intermodulation distortion between a transmission signal amplified by transmission power amplifier 11 and a transmission signal amplified by transmission power amplifier 12 overlaps at least a portion of the reception band of communication band C. As a result, it is possible to reduce the deterioration of reception sensitivity of reception path CR, which is caused when a harmonic of the transmission signal or intermodulation distortion between the transmission signals flows into reception path CR. In addition, it is possible to reduce deterioration of the signal quality of a transmission signal output from radio frequency module 1, which is caused when a harmonic of a high-power transmission signal that is transferred through transmission output paths AT to DT is superimposed on the high-power transmission signal. More specifically, since interference between a radio frequency signal of communication band A and a radio frequency of communication band C which are simultaneously transmitted, simultaneously received, or simultaneously transmitted and received is reduced, it is possible to provide radio frequency module 1 with a small size and an improved isolation between the radio frequency signals which are simultaneously transmitted, simultaneously received, or simultaneously transmitted and received.

In addition, radio frequency module 1 may further include: antenna connection terminal 100; and switch 55 that is disposed between (i) antenna connection terminal 100 and (ii) duplexers 61 and 63, may be configured to switch between connecting antenna connection terminal 100 to duplexer 61 and disconnecting antenna connection terminal 100 from duplexer 61, and may be configured to switch between connecting antenna connection terminal 100 to duplexer 63 and disconnecting antenna connection terminal 100 from duplexer 63. In radio frequency module 1, switch 55 may be disposed on principal surface 91b, and in a plan view of module board 91, a footprint of duplexer 61 overlaps with footprint of switch 55 may overlap, and duplexer 63 and switch 55 may be adjacent to each other.

According to this configuration, switch 55 and duplexer 61 face each other across module board 91, and thus it is possible to reduce the length of a line connecting switch 55 and duplexer 61. In other words, it is possible to reduce transfer loss of radio frequency signals of communication band A. In addition, switch 55 and duplexer 63 are adjacent to each other, and thus it is possible to reduce the length of a line connecting switch 55 and duplexer 63. In other words, it is possible to reduce transfer loss of radio frequency signals of communication band C.

In addition, radio frequency module 1 may be capable of at least one of simultaneously transmitting, simultaneously receiving, or simultaneously transmitting and receiving a radio frequency signal of communication band B and a radio frequency signal of communication band D. Radio frequency module 1, for example, does not simultaneously transmit, simultaneously receive, or simultaneously transmit and receive a radio frequency signal of communication band A and a radio frequency signal of communication band B, and does not simultaneously transmit, simultaneously receive, or simultaneously transmit and receive a radio frequency signal of communication band C and a radio frequency signal of communication band D. Radio frequency module 1 may further include: duplexer 62 that has, as pass bands, a transmission band and a reception band of communication band B; and duplexer 64 that has, as pass bands, a transmission band and a reception band of communication band D. In radio frequency module 1, duplexer 62 may be disposed on principal surface 91a, and duplexer 64 may be disposed on principal surface 91b.

According to this configuration, since duplexer 62 and duplexer 64 are disposed with module board 91 interposed therebetween, it is possible to reduce magnetic field coupling, electric field coupling, or electromagnetic field coupling between duplexer 62 and duplexer 64. For that reason, in the case where a radio frequency signal of communication band B and a radio frequency signal of communication band D are simultaneously transmitted, simultaneously received, or simultaneously transmitted and received, it is possible to reduce magnetic field coupling, electric field coupling, or electromagnetic field coupling between duplexers 62 and 64 even when, for example, (i) the frequency of a harmonic of a transmission signal of communication band B which has been amplified by transmission power amplifier 11 overlaps at least a portion of the reception band of communication band D or (ii) the frequency of intermodulation distortion between a transmission signal amplified by transmission power amplifier 11 and a transmission signal amplified by transmission power amplifier 12 overlaps at least a portion of the reception band of communication band D. As a result, it is possible to reduce the deterioration of reception sensitivity of reception path DR, which is caused when a harmonic of the transmission signal or intermodulation distortion between the transmission signals flows into reception path DR. In addition, it is possible to reduce deterioration of the signal quality of a transmission signal output from radio frequency module 1, which is caused when a harmonic of a high-power transmission signal that is transferred through transmission output paths AT to DT is superimposed on the high-power transmission signal. More specifically, since interference between a radio frequency signal of communication band B and a radio frequency of communication band D which are simultaneously transmitted, simultaneously received, or simultaneously transmitted and received is reduced, it is possible to provide radio frequency module 1 with a small size and an improved isolation between the radio frequency signals which are simultaneously transmitted, simultaneously received, or simultaneously transmitted and received.

In addition, radio frequency module 6 according to Embodiment 2 is capable of at least one of simultaneously transmitting, simultaneously receiving, or simultaneously transmitting and receiving a radio frequency signal of communication band A, a radio frequency signal of communication band B, and a radio frequency signal of communication band C. Radio frequency module 6 further includes: duplexer 61 that includes, as pass bands, a transmission band and a reception band of communication band A; duplexer 62 that includes, as pass bands, a transmission band and a reception band of communication band B; duplexer 63 that includes, as pass bands, a transmission band and a reception band of communication band C; and a plurality of external-connection terminals 150 disposed on principal surface 91b. Duplexer 61 is disposed on principal surface 91a, duplexer 62 is disposed on principal surface 91b, and duplexer 63 is disposed on principal surface 91b. External-connection terminal 150g having a ground potential is disposed between duplexer 62 and duplexer 63 in a plan view of module board 91.

In addition, in radio frequency module 6, duplexer 61 and duplexer 62 may be disposed on principal surface 91a, duplexer 63 may be disposed on principal surface 91b, and a conductive member may be disposed between duplexer 61 and duplexer 62 in a plan view of module board 91.

According to the above-described configurations, in the case where a radio frequency signal of communication band A, a radio frequency signal of communication band B, and a radio frequency signal of communication band C are simultaneously transmitted, simultaneously received, or simultaneously transmitted and received, it is possible to reduce magnetic field coupling, electric field coupling, or electromagnetic field coupling between duplexers 61, 62, and 63 even when, for example, (i) the frequency of a harmonic of a transmission signal of communication band A which has been amplified by transmission power amplifier 11 overlaps at least a portion of the reception band of communication band B or C or (ii) the frequency of intermodulation distortion between a transmission signal amplified by transmission power amplifier 11 and a transmission signal amplified by transmission power amplifier 12 or 13 overlaps at least a portion of the reception band of communication band B or C. As a result, it is possible to reduce the deterioration of reception sensitivity of reception paths BR or CR, which is caused when a harmonic of the transmission signal or intermodulation distortion between the transmission signals flows into reception path BR or CR. In addition, it is possible to reduce deterioration of the signal quality of a transmission signal output from radio frequency module 6 which is caused when a harmonic of a high-power transmission signal that is transferred through transmission output paths AT to CT is superimposed on the high-power transmission signal. More specifically, since interference between a radio frequency signal of communication band A, a radio frequency of communication band B, and a radio frequency of communication band C which are simultaneously transmitted, simultaneously received, or simultaneously transmitted and received is reduced, it is possible to provide radio frequency module 6 with a small size and an improved isolation between the radio frequency signals which are simultaneously transmitted, simultaneously received, or simultaneously transmitted and received.

In addition, the above-described conductive member may be one of (1) switch 55 that is disposed between (i) antenna connection terminal 100 and (ii) duplexers 61 to 63, and is configured to: switch between connecting antenna connection terminal 100 to duplexers 61 to 63 and disconnecting antenna connection terminal 100 from duplexers 61 to 63, (2) a first switch configured to switch between conduction and non-conduction between reception low noise amplifiers 21 to 23 and duplexers 61 to 63, (3) diplexer 60 disposed between antenna connection terminal 100 and duplexers 61 to 63, (4) a metallic conductor having one of a block shape, a plate shape, and a wire shape, (5) a chip capacitor, (6) a chip inductor, and (7) a control circuit configured to generate at least one of a control signal that adjusts a gain of reception low noise amplifiers 21 to 23 or a control signal that controls switching of switch 55 and switching of the first switch.

In addition, communication device 5 includes: antenna 2; RFIC 3 configured to process a radio frequency signal to be transmitted by antenna 2 and a radio frequency signal received by antenna 2; and radio frequency module 1 configured to transfer the radio frequency signals between antenna 2 and RFIC 3.

According to the above-described configuration, it is possible to provide communication device 5 that reduces the deterioration of isolation between a plurality of radio frequency signals when the plurality of radio frequency signals are simultaneously transmitted, simultaneously received, or simultaneously transmitted and received.

(Other Embodiments, Etc.)

Although the radio frequency module and the communication device according to the embodiment of the present disclosure have been described above based on the embodiment and the working examples, the radio frequency module and the communication device according to the present disclosure are not limited to the foregoing embodiment and the working examples. The present disclosure also encompasses other embodiments achieved by combining arbitrary structural components in the above-described embodiment and the working examples, variations resulting from various modifications to the above-described embodiment and the working examples that may be conceived by those skilled in the art without departing from the essence of the present disclosure, and various devices that include the above-described radio frequency module and the above-described communication device.

For example, in the radio frequency module and the communication device according to the foregoing embodiment and the working examples thereof, another circuit element and line, for example, may be inserted in a path connecting circuit elements and a signal path which are disclosed in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable widely in communication devices such as mobile phones as a radio frequency module disposed in a multiband-compatible front-end unit.

The invention claimed is:

1. A radio frequency module for at least one of simultaneously transmitting, simultaneously receiving, or simultaneously transmitting and receiving a radio frequency signal of a first communication band and a radio frequency signal of a second communication band, the radio frequency module comprising:
  a board including a first principal surface and a second principal surface on opposite sides of the board;
  a first duplexer disposed on the first principal surface and including a first transmission filter and a first reception filter, wherein the first transmission filter has, as a pass band, a transmission band of the first communication band, and the first reception filter has, as a pass band, a reception band of the first communication band;
  a second duplexer disposed on the second principal surface and including a second transmission filter and a second reception filter, wherein the second transmission filter has, as a pass band, a transmission band of the second communication band, and the second reception filter has, as a pass band, a reception band of the second communication band; and
  an antenna switch disposed on the second principal surface, wherein
  in a plan view of the board, a footprint of the first duplexer overlaps with a footprint of the antenna switch, the footprint of the first duplexer does not overlap with a footprint of the second duplexer, and the second duplexer and the antenna switch are adjacent to each other on the second principal surface.

2. The radio frequency module of claim 1, further comprising:
  an antenna connection terminal, wherein
  the antenna switch is disposed between the antenna connection terminal and the first duplexer and the second duplexer.

3. The radio frequency module of claim 2, wherein the antenna switch is configured to switch between connecting the antenna connection terminal to the first duplexer and disconnecting the antenna connection terminal from the first duplexer, and switch between connecting the antenna connection terminal to the second duplexer and disconnecting the antenna connection terminal from the second duplexer.

4. The radio frequency module of claim 1, wherein the radio frequency module is configured to at least one of simultaneously transmit, simultaneously receive, or simultaneously transmit and receive a radio frequency signal of a third communication band and a radio frequency signal of a fourth communication band.

5. The radio frequency module of claim 4, wherein the radio frequency module is configured to not simultaneously transmit, simultaneously receive, or simultaneously transmit and receive a radio frequency signal of the first communication band and a radio frequency signal of the third communication band, and not simultaneously transmit, simultaneously receive, or simultaneously transmit and receive a radio frequency signal of the second communication band and a radio frequency signal of the fourth communication band.

6. The radio frequency module of claim 5, further comprising:
  a third duplexer disposed on the first principal surface and including a third transmission filter and a third reception filter, wherein the third transmission filter has, as a pass band, a transmission band of the third communication band, the third reception filter having, as a pass band, a reception band of the third communication band.

7. The radio frequency module of claim 6, further comprising:
a fourth duplexer disposed on the second principal surface and including a fourth transmission filter and a fourth reception filter, wherein the fourth transmission filter has, as a pass band, a transmission band of the fourth communication band, the fourth reception filter having, as a pass band, a reception band of the fourth communication band.

8. The radio frequency module of claim 7, wherein the radio frequency module is configured to at least one of simultaneously transmit, simultaneously receive, or simultaneously transmit and receive a radio frequency signal of the first communication band, a radio frequency signal of the second communication band, and a radio frequency signal of a fifth communication band.

9. The radio frequency module of claim 8, further comprising:
a fifth duplexer including a fifth transmission filter and a fifth reception filter, wherein the fifth transmission filter has, as a pass band, a transmission band of the fifth communication band, the fifth reception filter having, as a pass band, a reception band of the fifth communication band.

10. The radio frequency module of claim 9, further comprising:
a plurality of external-connection terminals disposed on the second principal surface, wherein
the fifth duplexer is disposed on the second principal surface, and
the plurality of external-connection terminals include an external-connection terminal having a ground potential and disposed between the second duplexer and the fifth duplexer in a plan view of the board.

11. The radio frequency module of claim 9, further comprising:
a plurality of external-connection terminals disposed on the second principal surface, wherein
the third duplexer is disposed on the first principal surface, and
a conductive member is disposed between the first duplexer and the third duplexer in a plan view of the board.

12. The radio frequency module of claim 11, wherein the conductive member is an antenna switch disposed between an antenna connection terminal and the first duplexer, the second duplexer, and the third duplexer, wherein
the antenna switch is configured to
switch between connecting the antenna connection terminal to the first duplexer and disconnecting the antenna connection terminal from the first duplexer;
switch between connecting the antenna connection terminal to the second duplexer and disconnecting the antenna connection terminal from the second duplexer; and
switch between connecting the antenna connection terminal to the fifth duplexer and disconnecting the antenna connection terminal from the third duplexer.

13. The radio frequency module of claim 11, wherein the conductive member is a first switch configured to switch between conduction and non-conduction between a reception low noise amplifier and each of the first duplexer, the second duplexer, and the third duplexer.

14. The radio frequency module of claim 11, wherein the conductive member is a multiplexer disposed between the antenna connection terminal and the first duplexer, the second duplexer, and the third duplexer.

15. The radio frequency module of claim 11, wherein the conductive member is a metallic conductor having one of a block shape, a plate shape, and a wire shape.

16. The radio frequency module of claim 11, wherein the conductive member is a chip capacitor.

17. The radio frequency module of claim 11, wherein the conductive member is a chip inductor.

18. The radio frequency module of claim 11, wherein the conductive member is a control circuit configured to generate at least one of a control signal that adjusts a gain of the reception low noise amplifier or a control signal that controls switching of the antenna switch and switching of the first switch.

19. The radio frequency module of claim 1, further comprising:
a diplexer disposed on the first principal surface, wherein a footprint of the diplexer overlaps with the footprint of the second duplexer.

20. A communication device, comprising:
an antenna;
a radio frequency (RF) signal processing circuit configured to process a radio frequency signal to be transmitted by the antenna and a radio frequency signal received by the antenna; and
a radio frequency module configured to transfer the radio frequency signals between the antenna and the RF signal processing circuit, the radio frequency module comprising:
a board including a first principal surface and a second principal surface on opposite sides of the board;
a first duplexer disposed on the first principal surface and including a first transmission filter and a first reception filter, wherein the first transmission filter has, as a pass band, a transmission band of a first communication band, the first reception filter having, as a pass band, a reception band of the first communication band; and
a second duplexer disposed on the second principal surface and including a second transmission filter and a second reception filter, wherein the second transmission filter has, as a pass band, a transmission band of a second communication band, the second reception filter having, as a pass band, a reception band of the second communication band, wherein
an antenna switch disposed on the second principal surface, wherein
in a plan view of the board, a footprint of the first duplexer overlaps with a footprint of the antenna switch, the footprint of the first duplexer does not overlap with a footprint of the second duplexer, and the second duplexer and the antenna switch are adjacent to each other on the second principal surface.

* * * * *